Oct. 2, 1951  E. C. QUEAR ET AL  2,569,535
APPARATUS FOR MOLDING THERMOPLASTIC MATERIAL
Filed Dec. 13, 1947  19 Sheets-Sheet 1
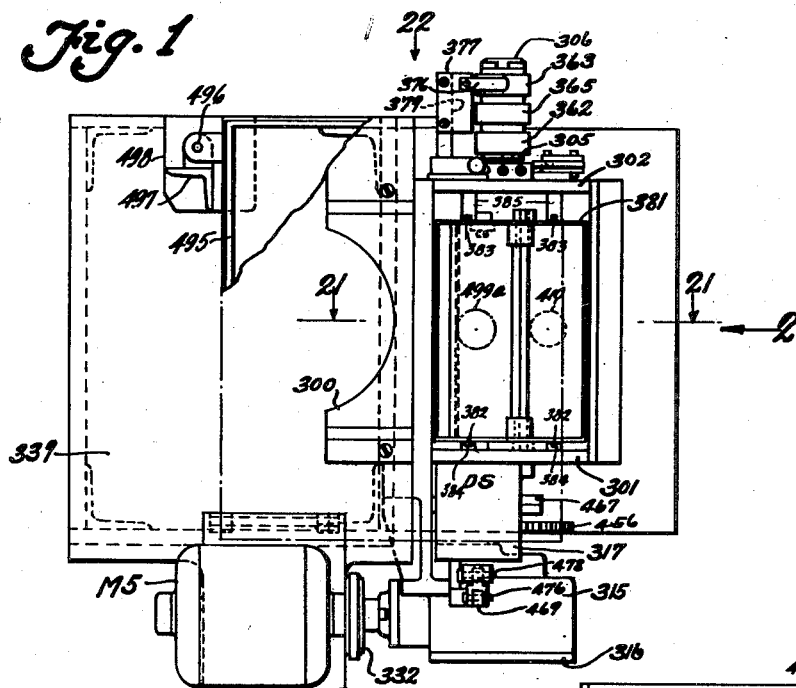
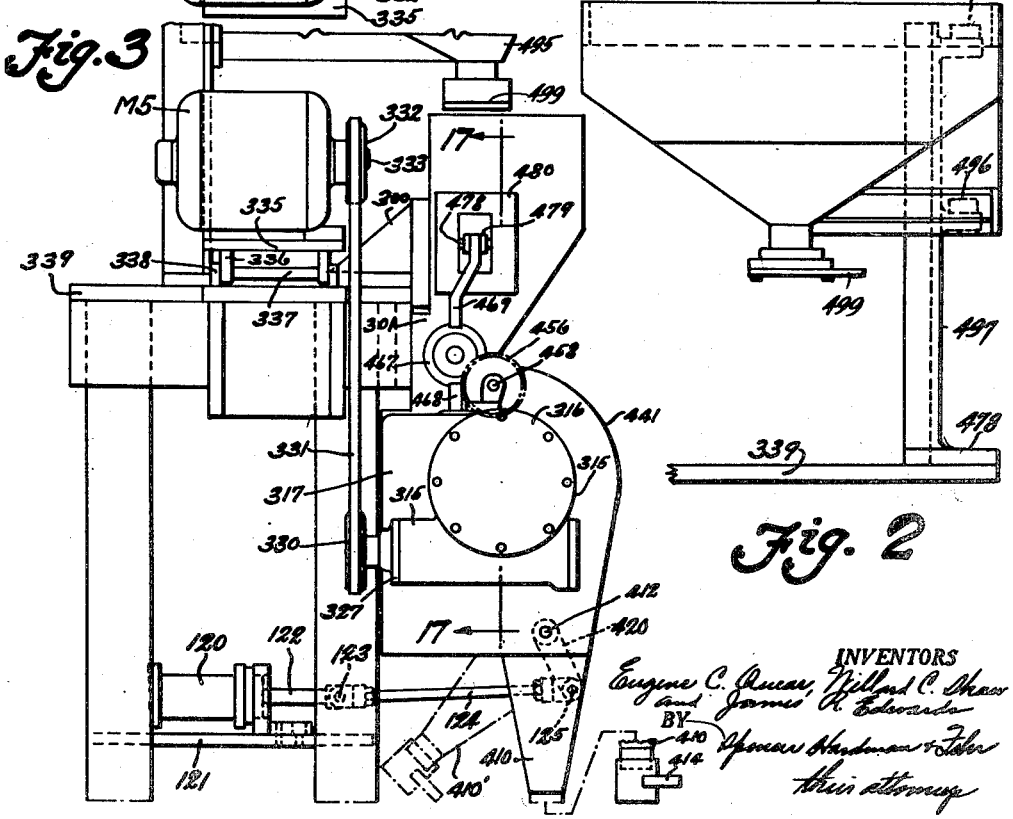

Oct. 2, 1951                E. C. QUEAR ET AL                 2,569,535
              APPARATUS FOR MOLDING THERMOPLASTIC MATERIAL
Filed Dec. 13, 1947                                    19 Sheets-Sheet 2
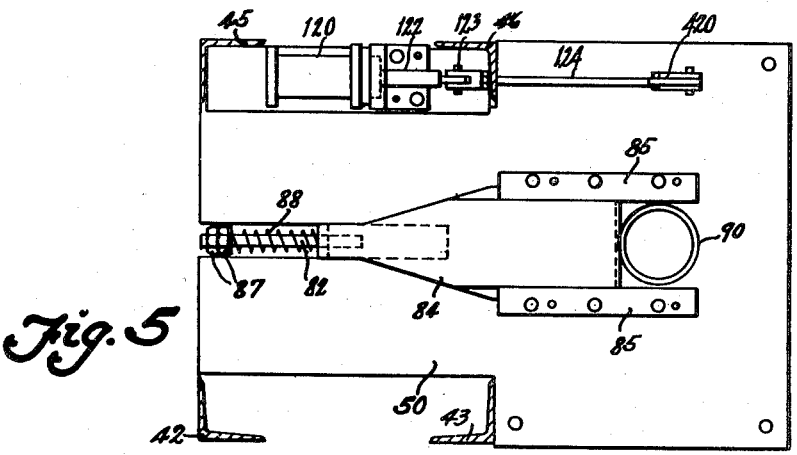
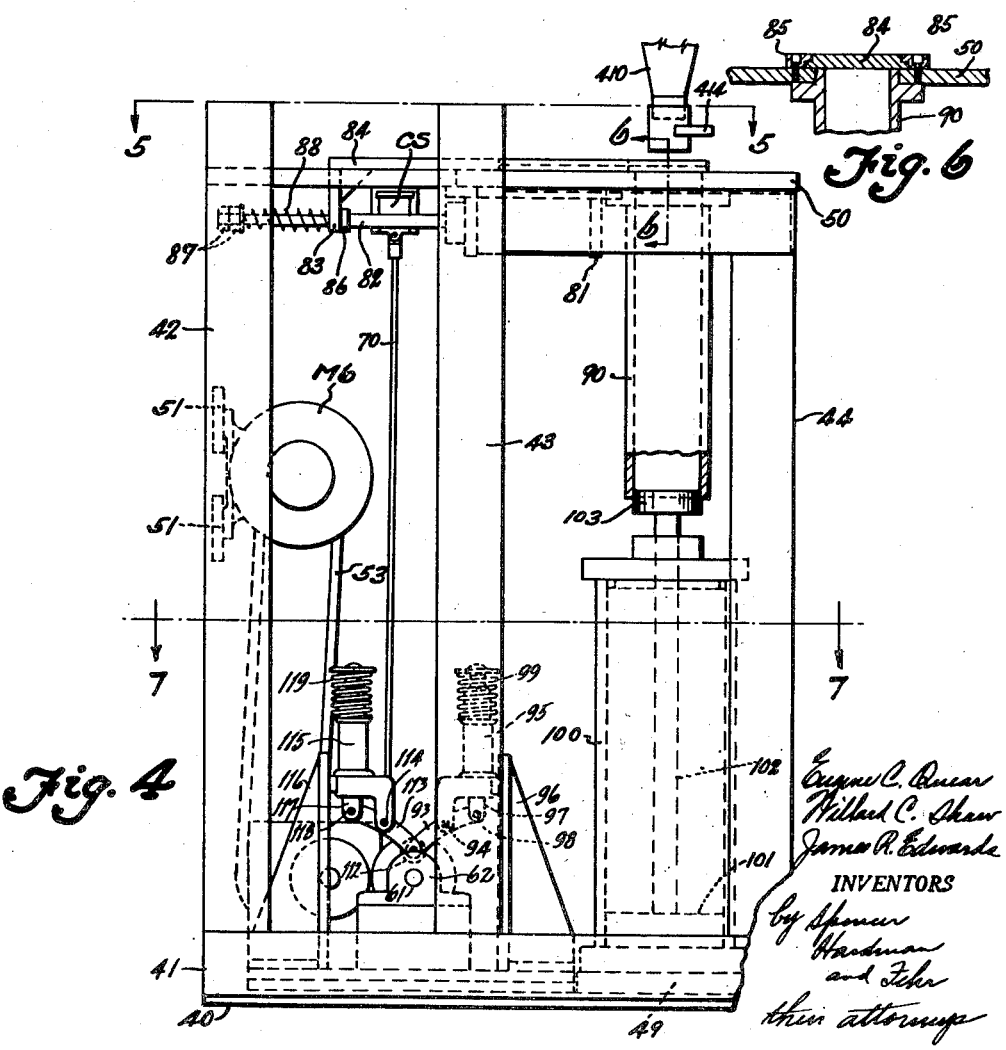

Oct. 2, 1951     E. C. QUEAR ET AL     2,569,535
APPARATUS FOR MOLDING THERMOPLASTIC MATERIAL
Filed Dec. 13, 1947     19 Sheets-Sheet 4
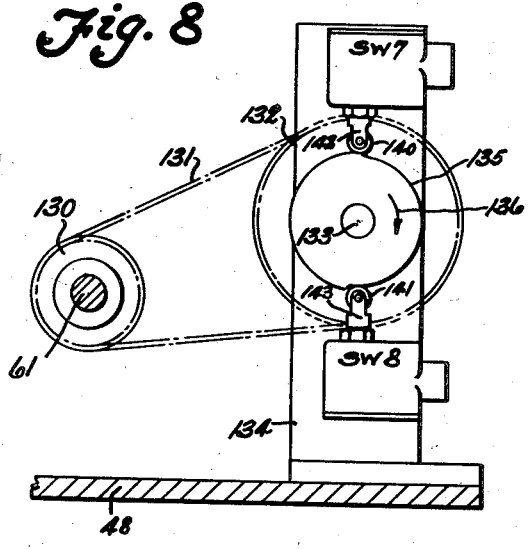
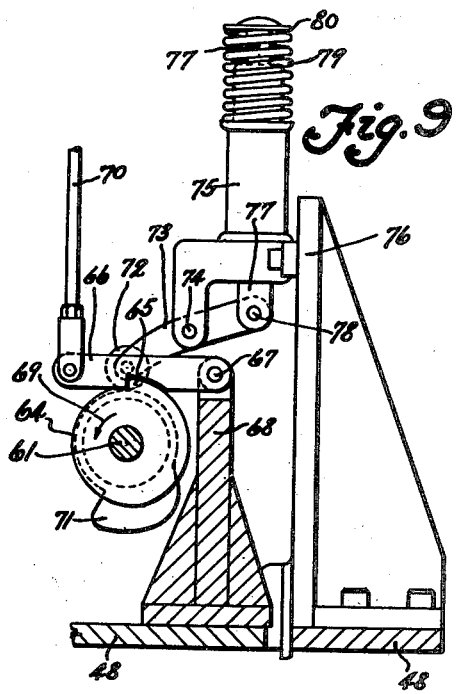
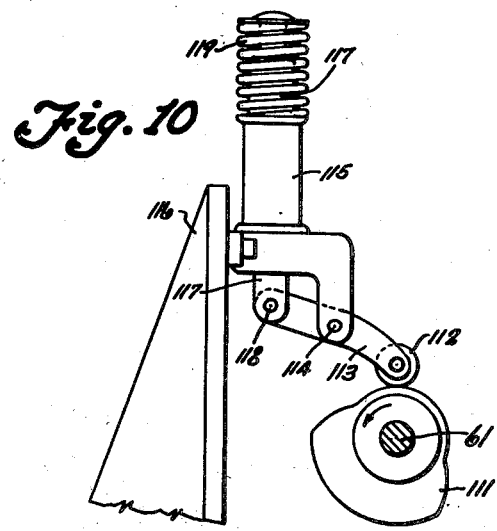
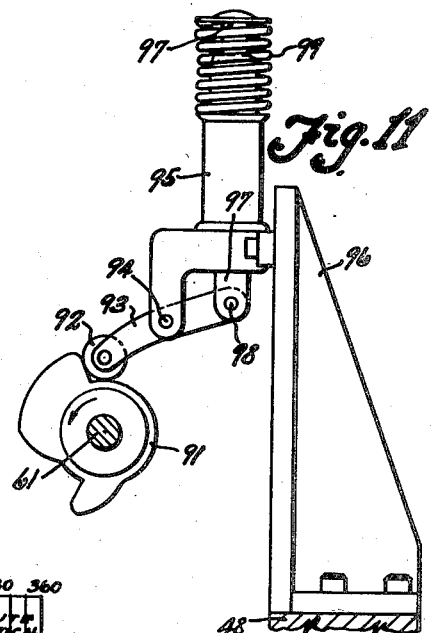
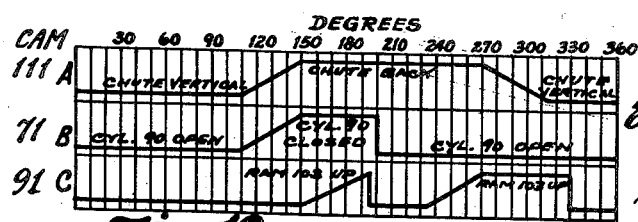

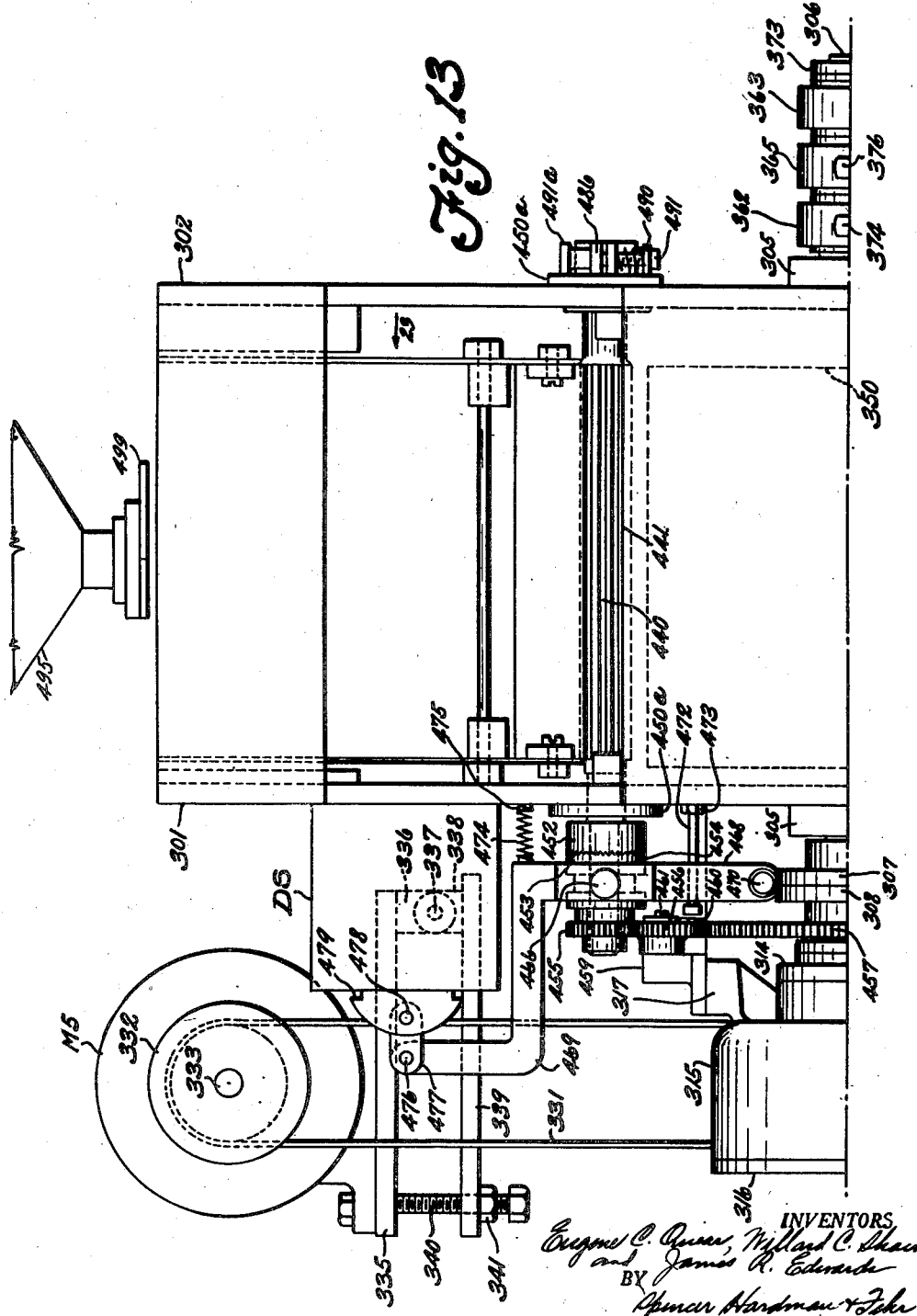

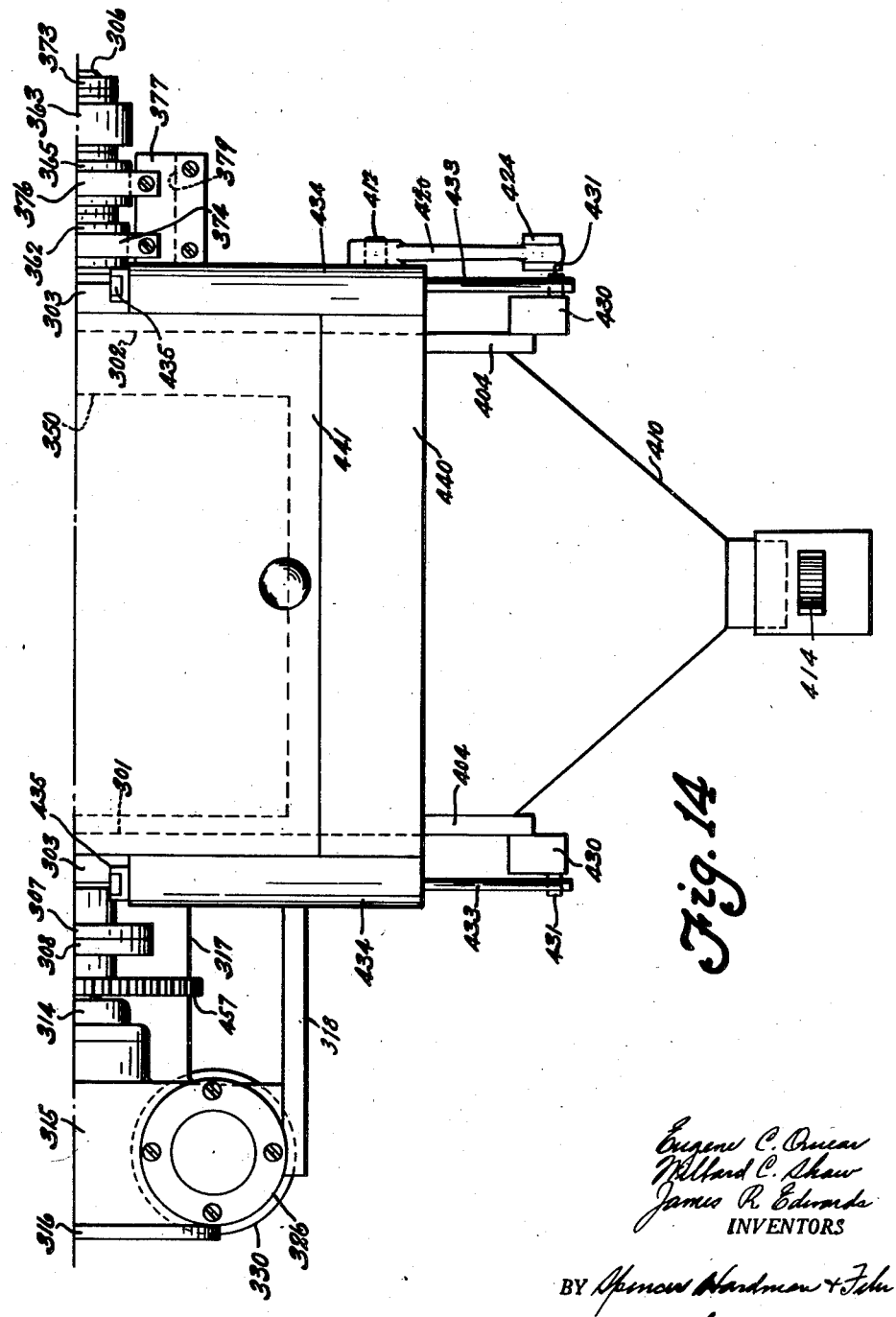

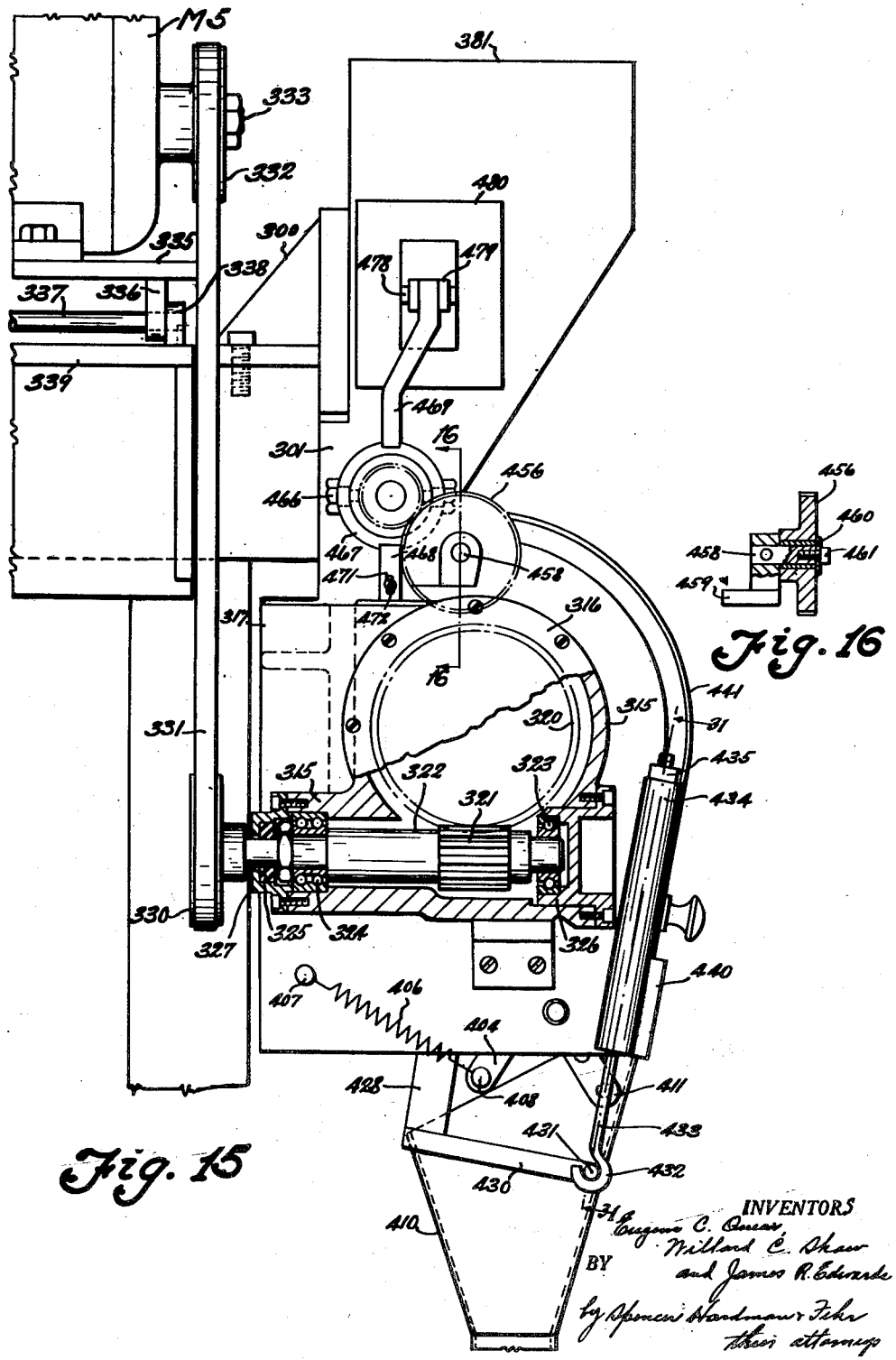

Oct. 2, 1951 E. C. QUEAR ET AL 2,569,535
APPARATUS FOR MOLDING THERMOPLASTIC MATERIAL
Filed Dec. 13, 1947 19 Sheets-Sheet 8

Eugene C. Quear
Millard C. Shaw
James R. Edwards
INVENTORS

BY Spencer Hardman & Fehr
their attorneys

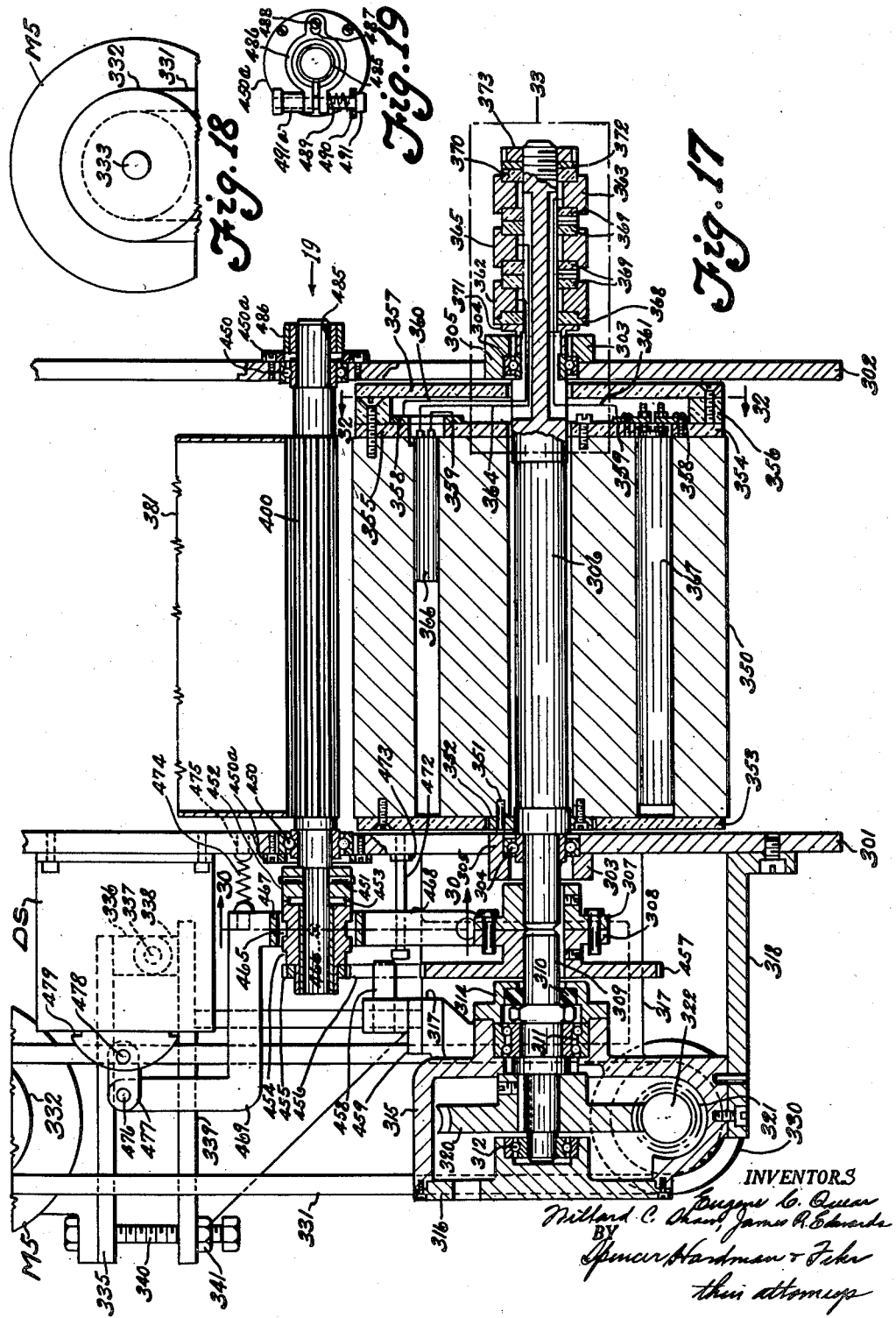

Oct. 2, 1951     E. C. QUEAR ET AL     2,569,535
APPARATUS FOR MOLDING THERMOPLASTIC MATERIAL
Filed Dec. 13, 1947     19 Sheets-Sheet 10
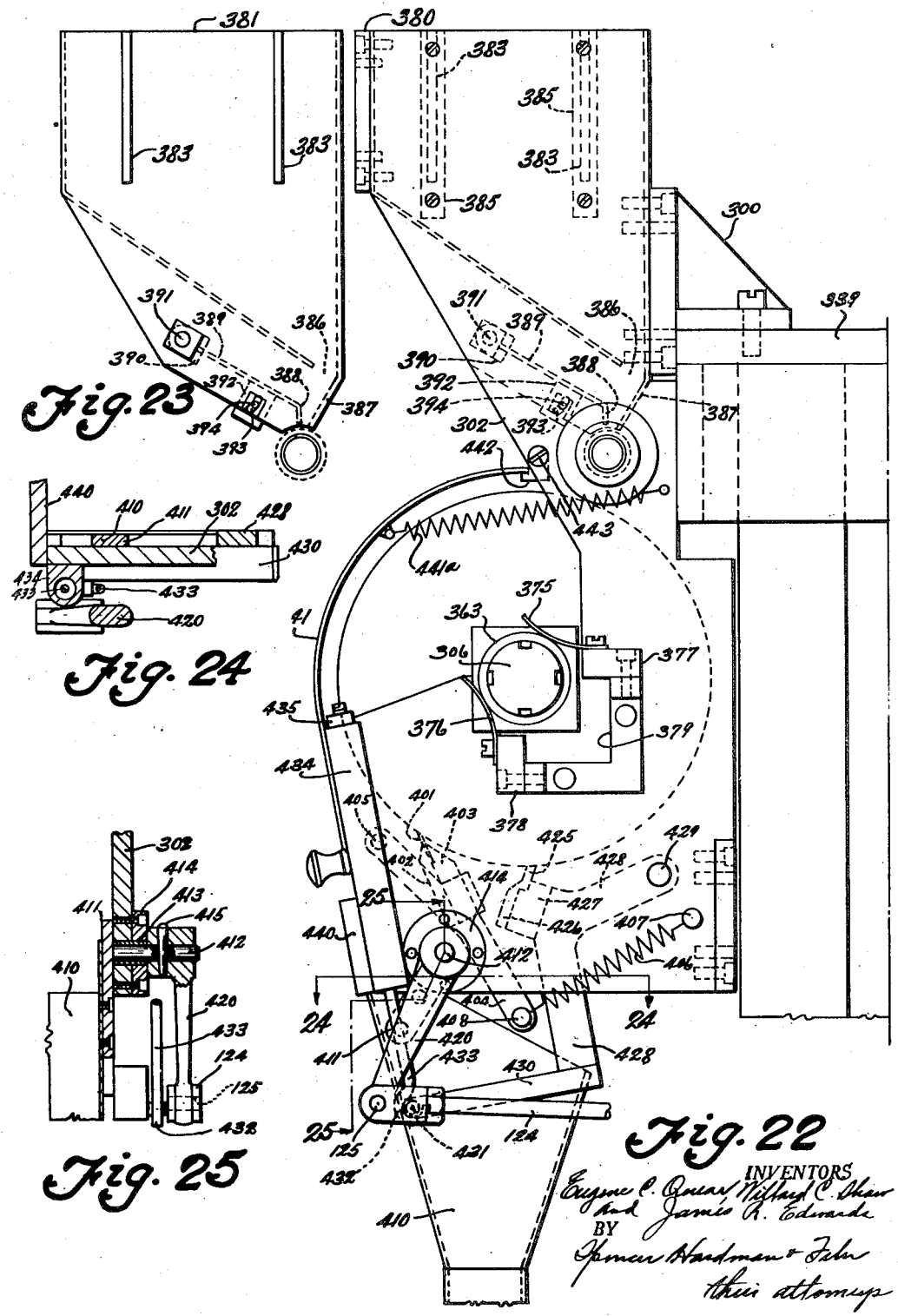

Oct. 2, 1951     E. C. QUEAR ET AL     2,569,535
APPARATUS FOR MOLDING THERMOPLASTIC MATERIAL
Filed Dec. 13, 1947     19 Sheets-Sheet 11
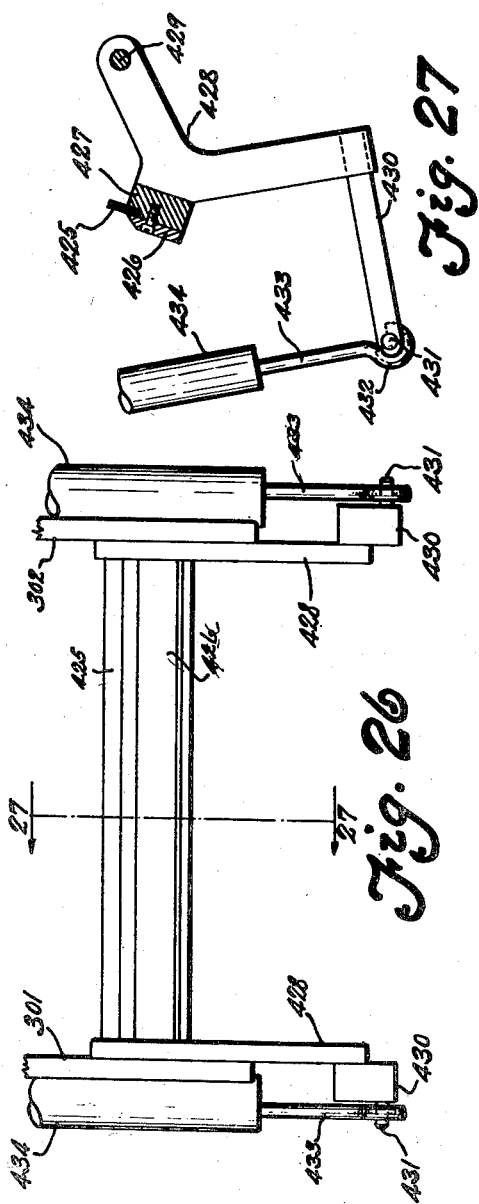
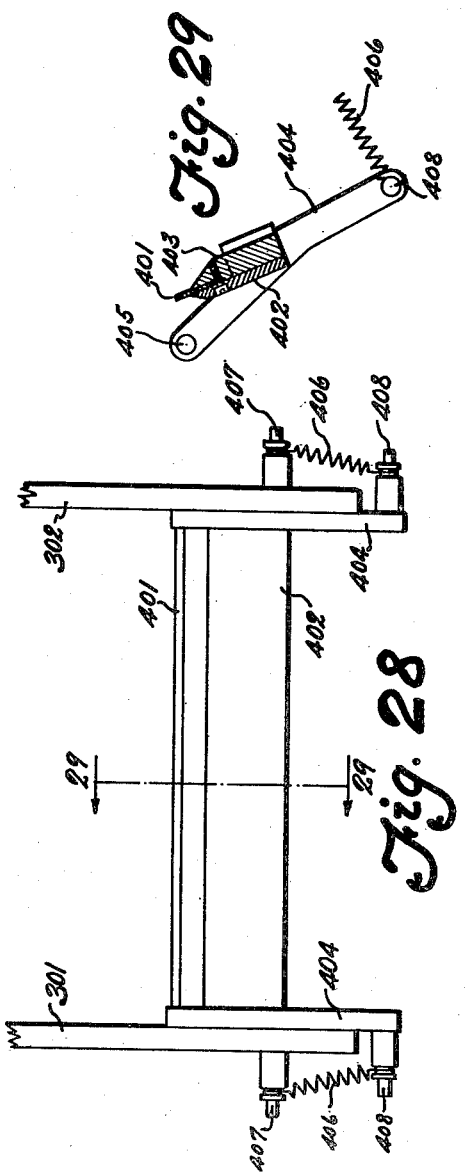
INVENTORS
Eugene C. Quear, Millard P. Shaw
BY James R. Edwards
Spencer Hardman & Fehr
their attorneys Oct. 2, 1951 E. C. QUEAR ET AL 2,569,535
APPARATUS FOR MOLDING THERMOPLASTIC MATERIAL
Filed Dec. 13, 1947 19 Sheets-Sheet 12
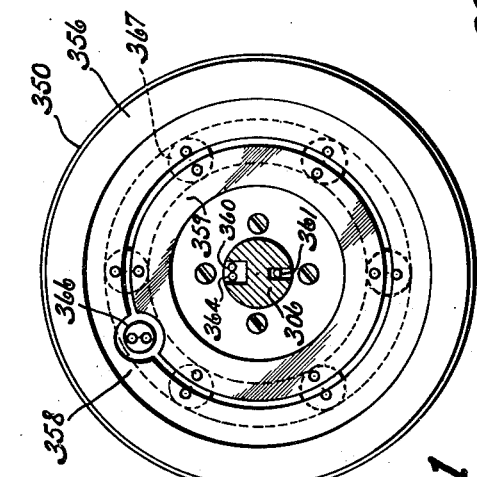
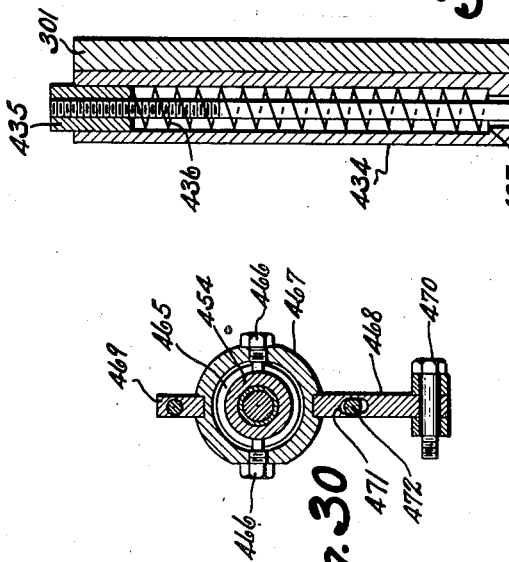
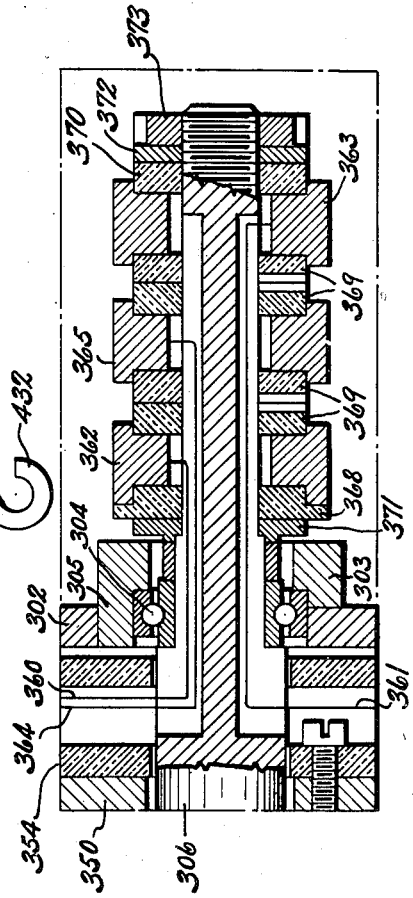

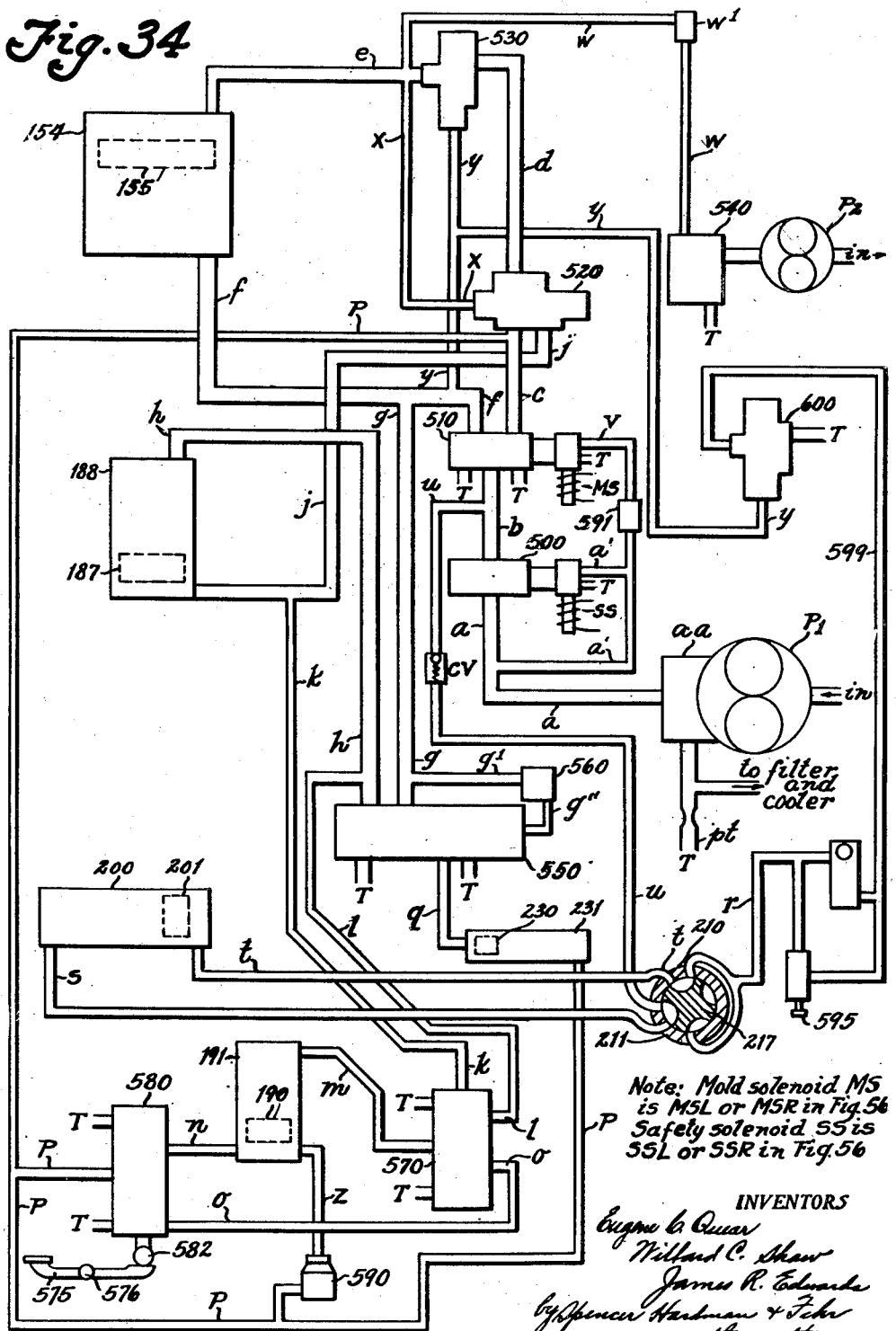

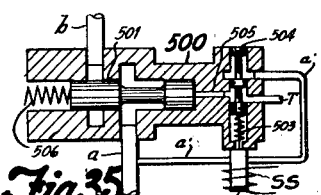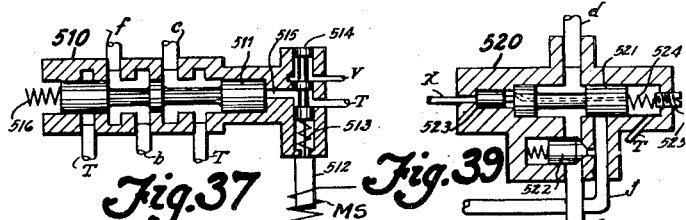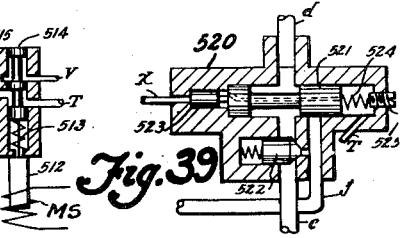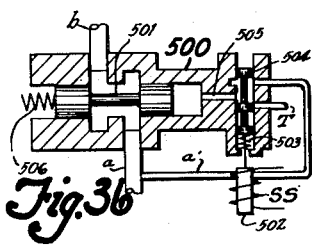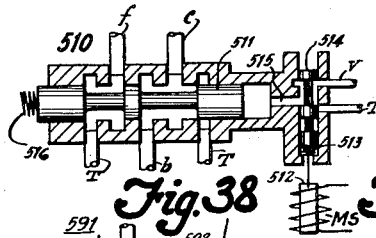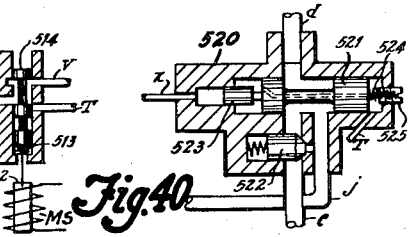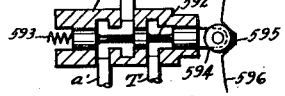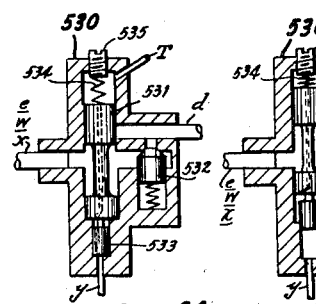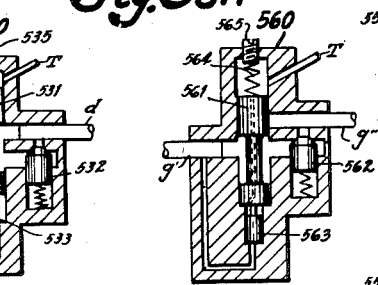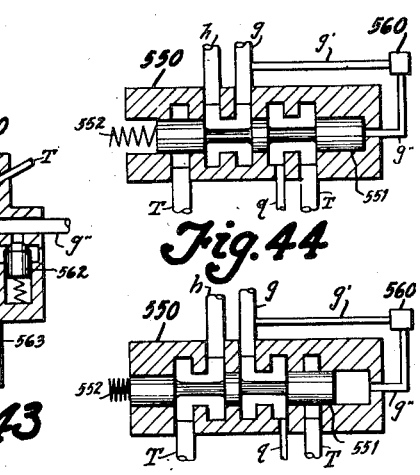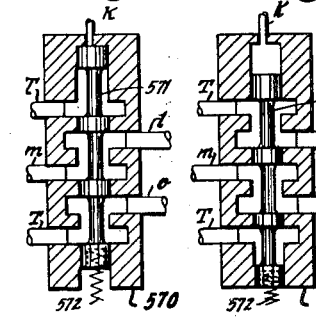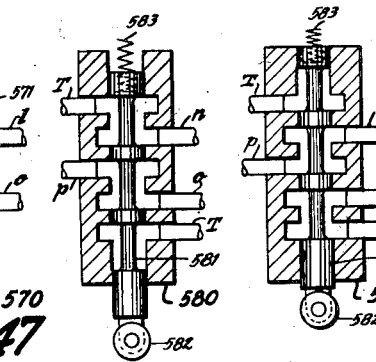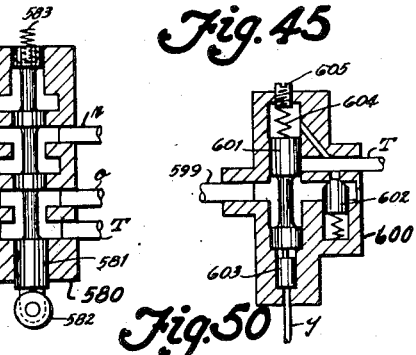

Oct. 2, 1951   E. C. QUEAR ET AL   2,569,535
APPARATUS FOR MOLDING THERMOPLASTIC MATERIAL
Filed Dec. 13, 1947   19 Sheets-Sheet 15
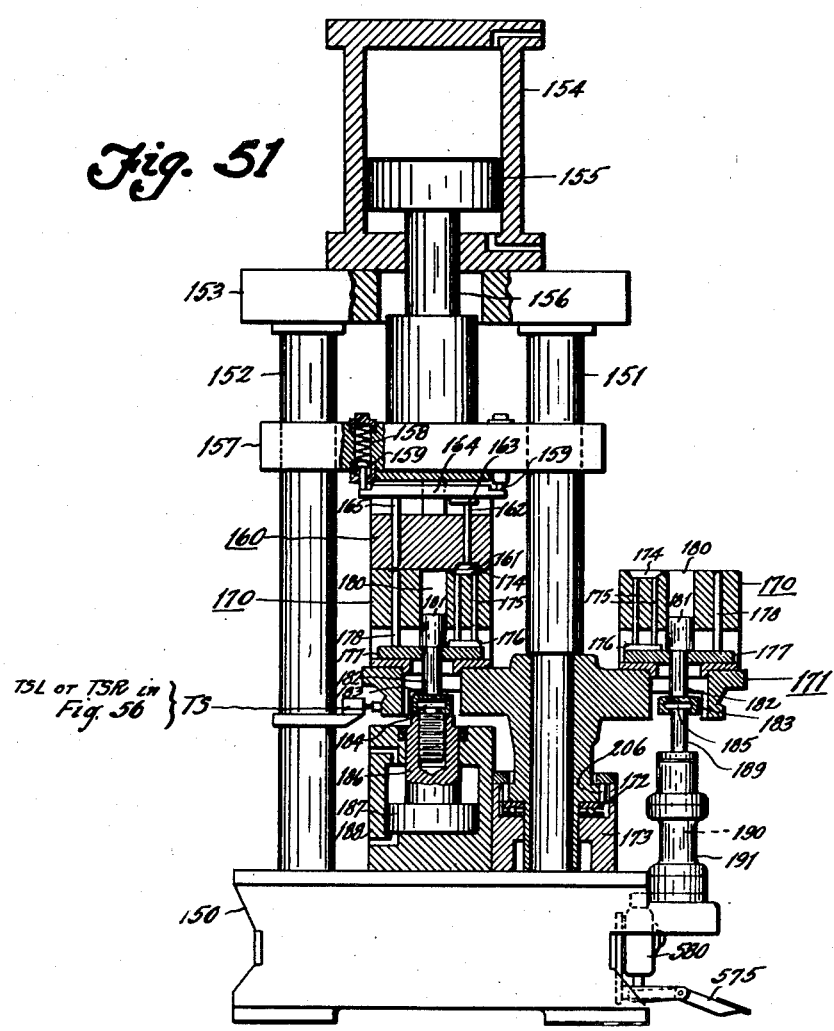
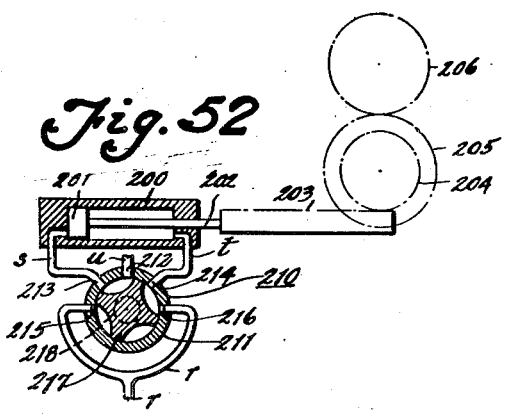
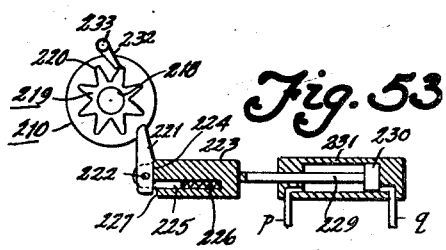
INVENTORS
Eugene C. Quear
Willard C. Shaw
James R. Edwards
by Spencer Hardman & Fehr
their attorneys

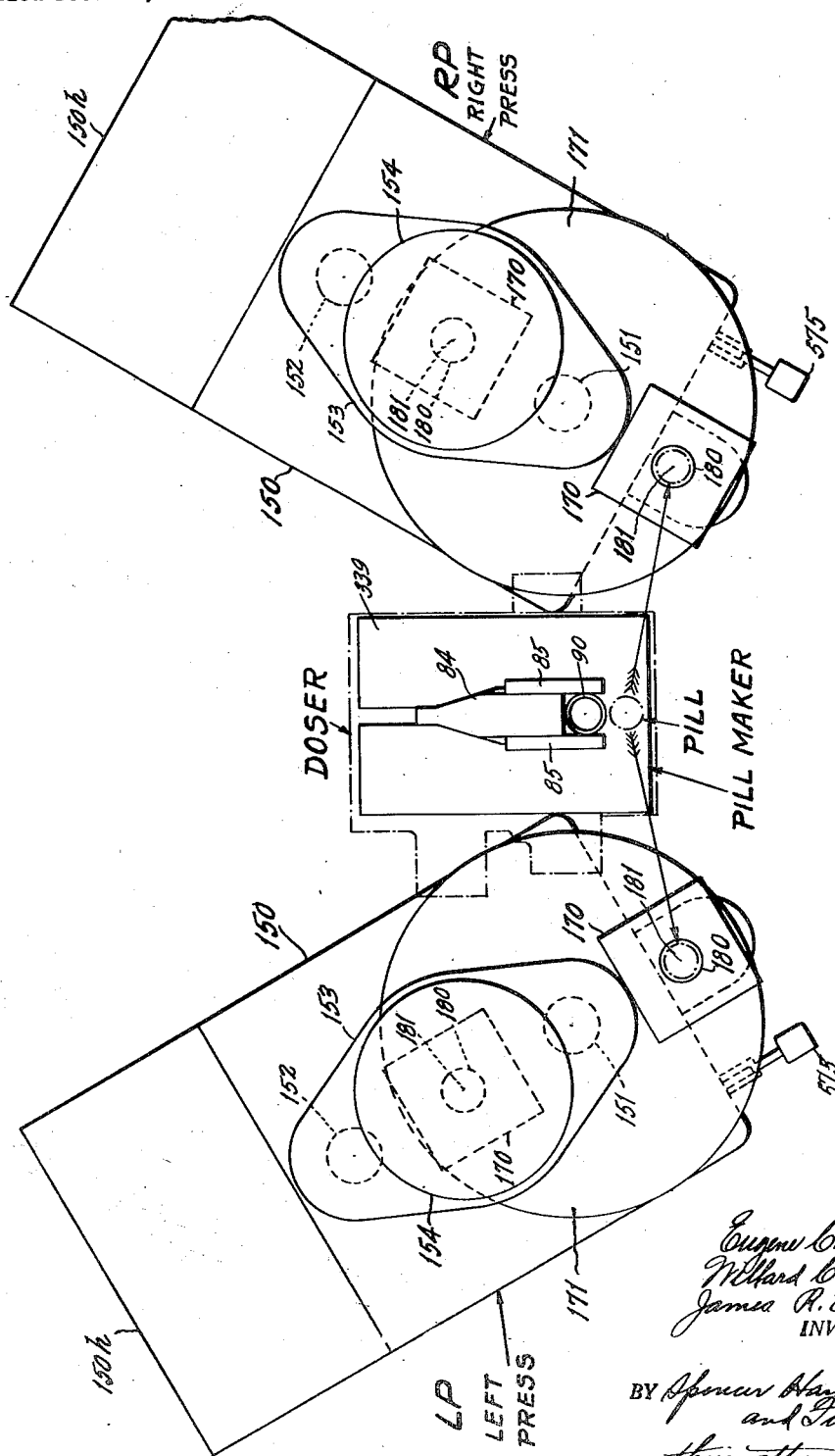

Oct. 2, 1951     E. C. QUEAR ET AL     2,569,535
APPARATUS FOR MOLDING THERMOPLASTIC MATERIAL

Patented Oct. 2, 1951

2,569,535

UNITED STATES PATENT OFFICE 2,569,535

APPARATUS FOR MOLDING THERMOPLASTIC MATERIAL

Eugene C. Quear and Willard C. Shaw, Anderson, and James R. Edwards, Middletown, Ind., assignors to General Motors Corporation, Detroit, Mich., a corporation of Delaware Application December 13, 1947, Serial No. 791,520

6 Claims. (Cl. 18—30)

This invention relates to the art of molding thermosetting plastic compounds. The copending applications of C. A. Nichols, et al., Serial No. 692,274, filed August 22, 1946 now Patent No. 2,523,137 and Serial No. 774,592, filed September 17, 1947 now Patent No. 2,531,524 disclose apparatuses for preheating comminuted molding material and dropping it into the open injection cylinder of a heated lower mold whose mold cavities are connected by runners with the cylinder. Immediately after charging it, the lower mold is moved under a heated upper mold which is caused to descend upon it with pressure and a ram or piston in the injection cylinder is caused to ascend to force the preheated material into the cavities provided by the engaging molds; and the material is cured under pressure and heat derived from the molds. The equipment disclosed in these applications has proved to be satisfactory in molding relatively small parts, for example, the molded parts of electric switches used on automobiles.

An object of the invention is to improve the apparatus stated above in order to facilitate the molding of relatively large articles such as ignition distributor caps and ignition coil case covers. It has been discovered that the molding of relatively large articles as well as smaller ones can be facilitated if the preheated, loose, comminuted mold material is briquetted while hot before being placed while hot in the mold injection cylinder. The reasons for this are not entirely known but it is believed that compressing the preheated material tends to equalize the temperature of the mass of material and tends to expel from the mass vapors of volatile matter which each preheated particle gives off. Whatever the reasons may be, when the hot briquette of preheated material is compressed in the injection cylinder of the lower mold, it readily fills the mold cavities completely.

A further object is to provide apparatus by which the briquetting step can be rapidly effected. To this end, the invention provides a combined preheating and briquetting unit by which a predetermined mass of molding material is preheated and discharged into the open end of a briquetting cylinder. The cylinder is then closed by a plate and a ram in the cylinder forces the material against the plate to form a briquette or pill which the ram ejects from the cylinder after the plate is retracted.

A further object of the invention is to provide a one-man operated molding outfit comprising two molding presses, a combined preheating and briquetting unit located between them and control apparatus which causes the presses to operate in overlapping cycles, one-half cycle out of phase for example, and which causes said unit to provide briquettes alternately for the two presses according to their needs.

Further objects and advantages of the present invention will be apparent from the following description, reference being had to the accompanying drawings, wherein a preferred embodiment of the present invention is clearly shown.

In the drawings:

Fig. 1 is a plan view of the preheating and briquetting unit embodying the present invention.

Fig. 2 is a view taken in the direction of arrow 2 of Fig. 1 showing the large supply hopper mounted upon the frame work of the preheating and briquetting unit.

Figs. 3 and 4 together constitute a side elevation of the heating and briquetting unit.

Figs. 5 and 6 are sectional views respectively on lines 5—5 and 6—6 of Fig. 4.

Figure 7:
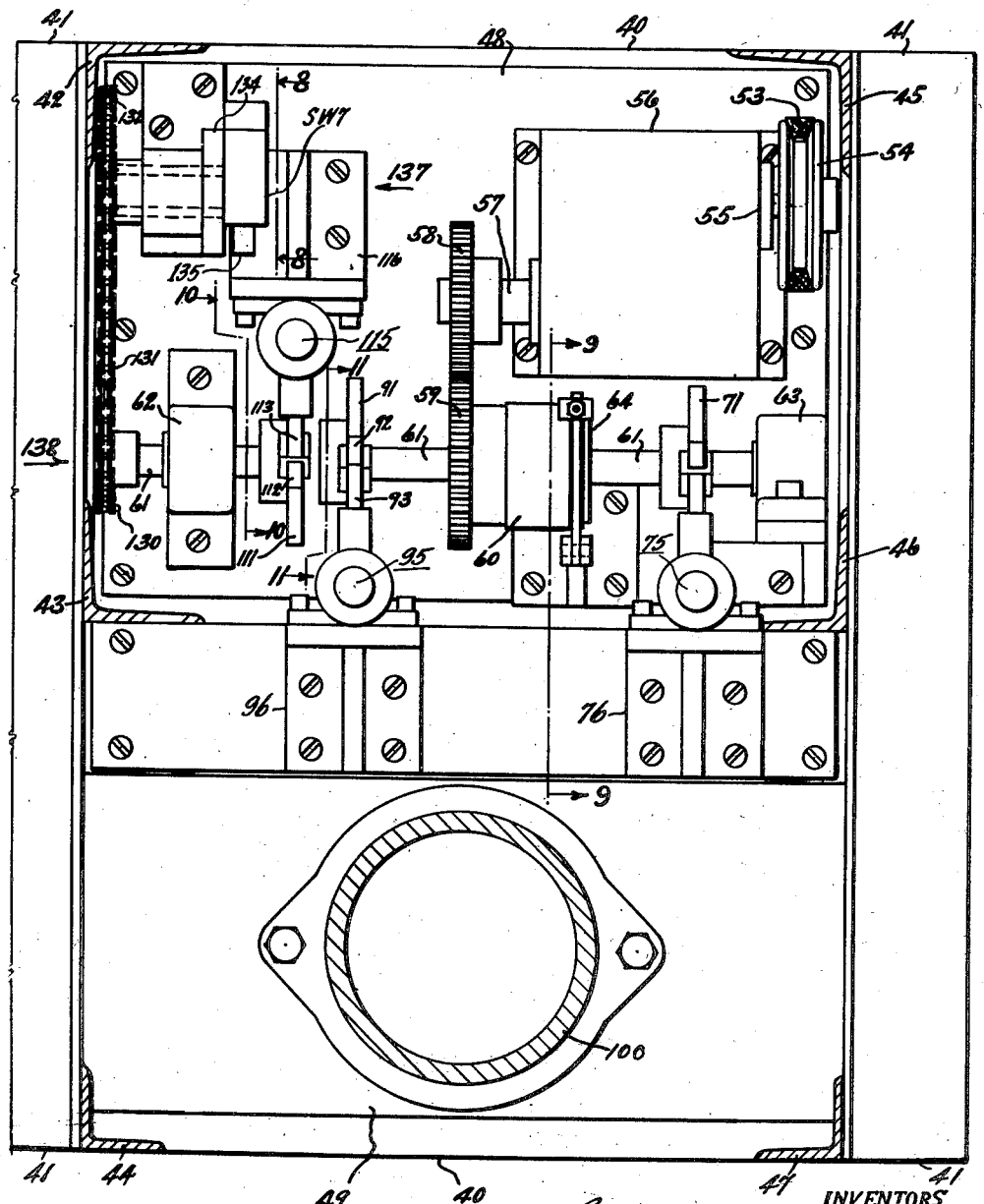

Fig. 7 is a sectional view on line 7—7 of Fig. 4 and is drawn to a larger scale.

Figs. 8, 9, 10 and 11 are sectional views taken respectively on the lines 8—8, 9—9, 10—10 and 11—11 of Fig. 7.

Fig. 12 is a chart showing the operation of the cams shown in Figs. 9, 10 and 11.

Figs. 13 and 14 together form a front view of the preheating apparatus.

Fig. 15 is a left side view of the apparatus shown in Figs. 13 and 14.

Fig. 16 is a fragmentary sectional view on the line 16—16 of Fig. 15.

Figs. 17 and 18 together form a sectional view on the line 17—17 of Fig. 3.

Fig. 19 is a fragmentary view in the direction of arrow 19 of Fig. 17.

Figures 20, 21:
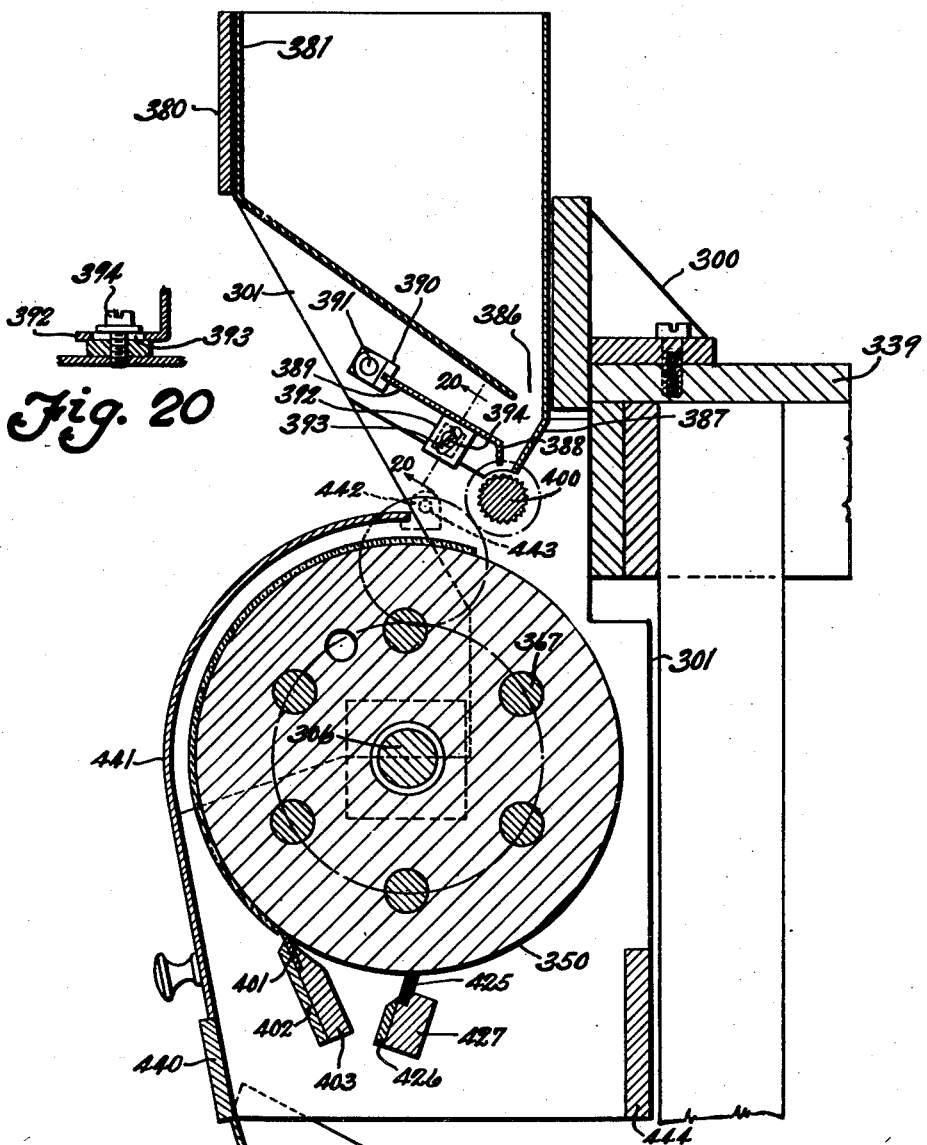

Fig. 20 is a fragmentary sectional view on the line 20—20 of Fig. 21.

Fig. 21 is a sectional view on the line 21—21 of Fig. 1.

Fig. 22 is a side view looking in the direction of arrow 22 of Fig. 1.

Fig. 23 is a side view of a hopper looking in the direction of arrow 23 of Fig. 13.

Fig. 24 is a fragmentary sectional view on the line 24—24 of Fig. 22.

Fig. 25 is a fragmentary sectional view on the line 25—25 of Fig. 22.

Fig. 26 is a front view of the roller cleaner assembly.

Fig. 27 is a sectional view on the line 27—27 of Fig. 26.

Fig. 28 is a front view of the roller scraper assembly.

Fig. 29 is a sectional view on the line 29—29 of Fig. 28.

Fig. 30 is a fragmentary sectional view on the line 30—30 of Fig. 17.

Fig. 31 is a fragmentary sectional view on the line 31—31 of Fig. 15.

Fig. 32 is a fragmentary sectional view on the line 32—32 of Fig. 17.

Fig. 33 is a fragmentary sectional view showing on an enlarged scale the parts within the dot-dash rectangle 33 of Fig. 17.

Fig. 34 is a diagram of the hydraulic system for each of the presses represented in Fig. 54.

Figs. 35 to 50 inclusive are sectional views of the valves included in the hydraulic system.

Fig. 51 is a diagrammatic front view, partly in vertical longitudinal section of each of the presses shown in Fig. 54.

Fig. 52 is a diagram of the apparatus for indexing the press table.

Fig. 53 is a diagram of the apparatus for indexing the valve 210 shown in Fig. 52.

Fig. 54 is a diagrammatic plan view of a molding outfit comprising two hydraulic presses marked "Left press" and "Right press" and a combined preheating and briquetting unit marked "Doser" and "Pill-maker."

Figure 55:
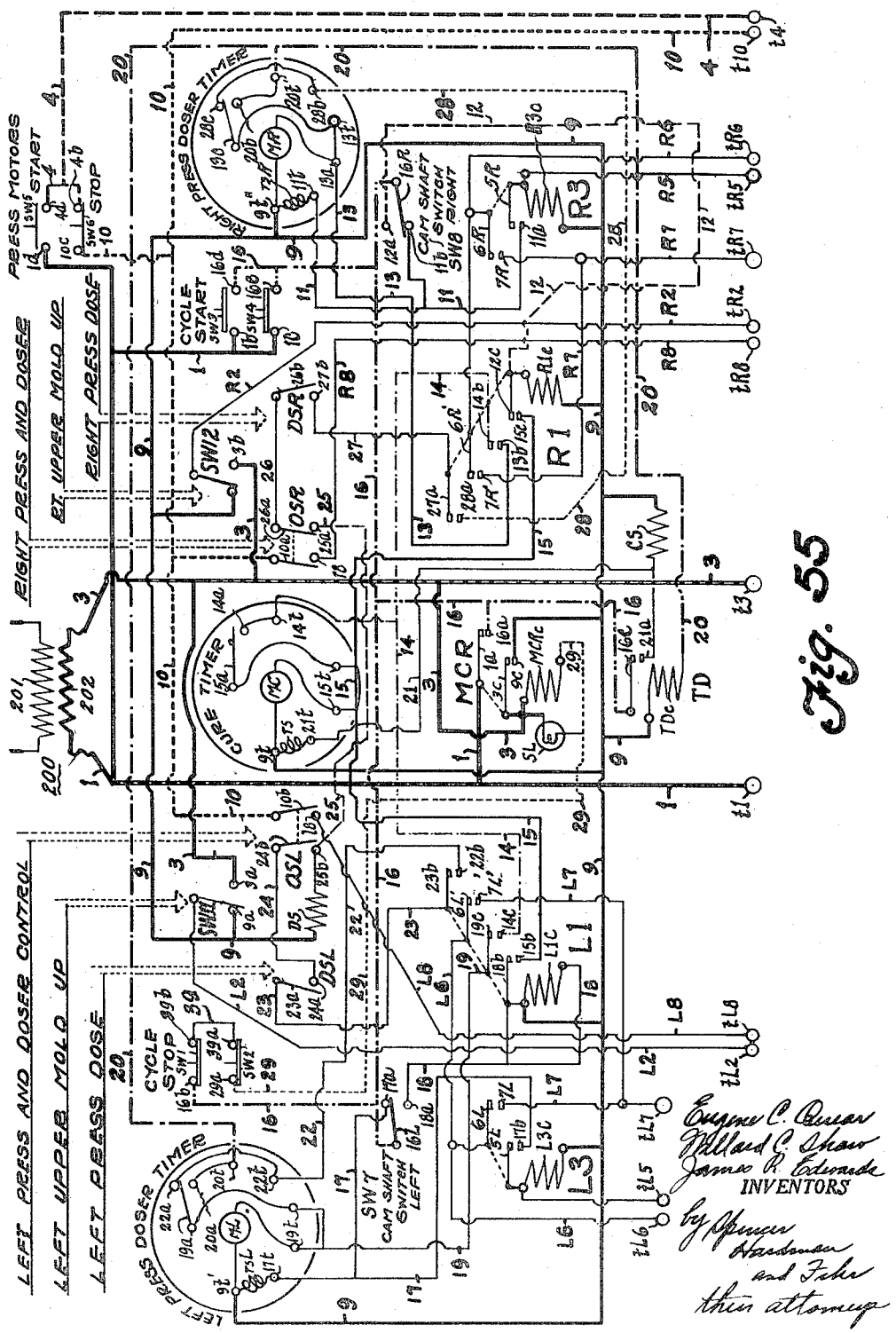
Figure 56:
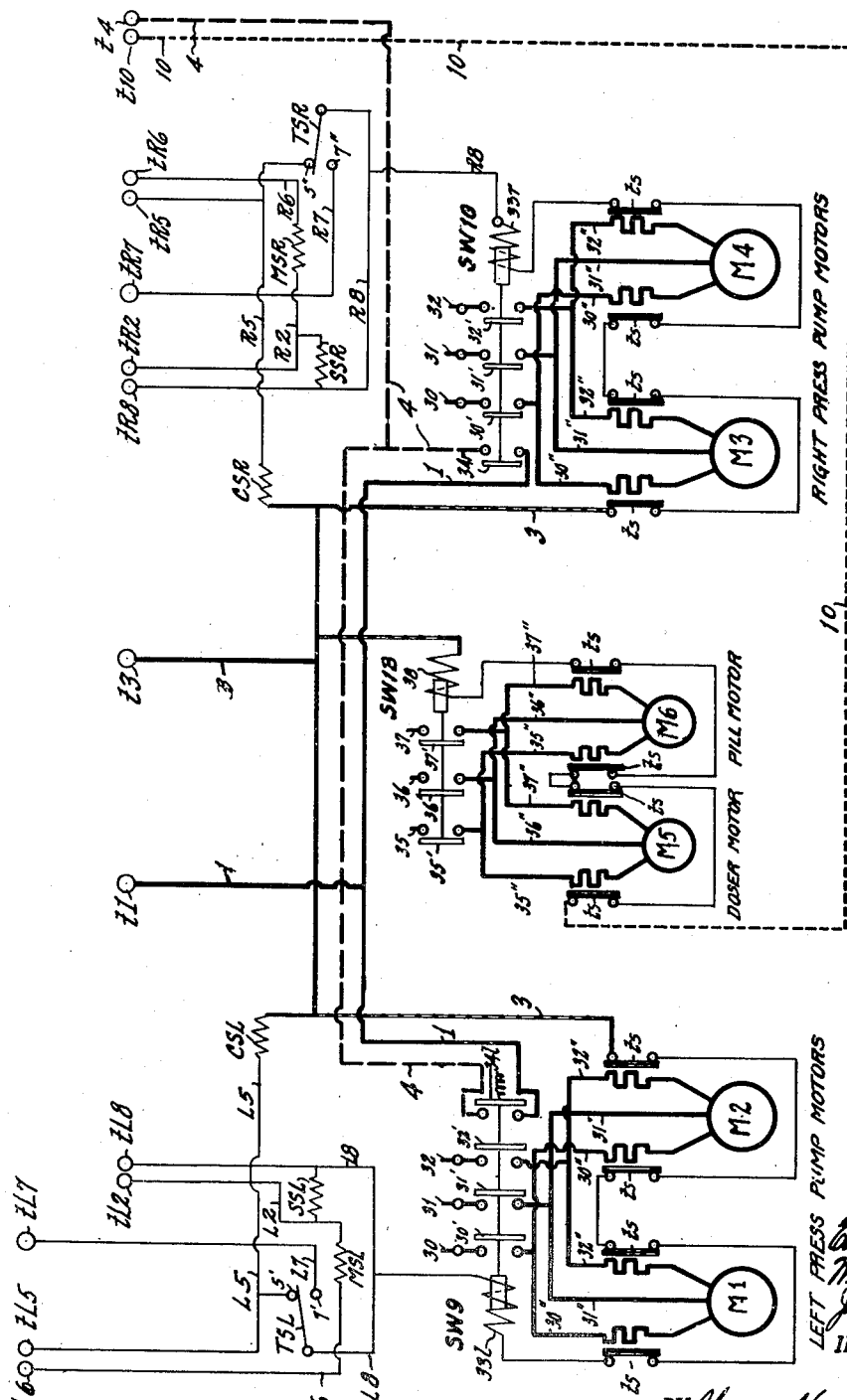

Figs. 55 and 56 together comprise a wiring diagram of controls for the presses and dosers shown in Fig. 34.

Fig. 57 is a chart explaining Figs. 55 and 56.

The apparatus disclosed herein provides for preheating a predetermined quantity of comminuted molding material and compacting this material while hot to form a briquette or pill which is transferred while hot into the open injection cylinder of a mold which is then placed under a companion mold which is caused to descend upon it with pressure, and, while said pressure is maintained, a ram in the injection cylinder of the lower mold is caused to ascend to force the pill of preheated material while still hot and to cause it to flow through runners from the injection cylinder into the mold cavities provided by the two molds so that the material will be cured by the applied pressure and heat derived from the molds which are heated to the desired temperature. The preheating or dosing and briquetting or pill-making apparatuses are combined in a single unit which can be placed alongside a molding press or between two molding presses which operate alternately. The latter arrangement is shown in Fig. 34 which the doser represented by dot-dash lines is located above the pill-maker.

*Pill-maker*

The pill-maker will first be described with reference to Figs. 4 through 12. The supporting structure comprises a base 40, horizontal angles 41 (Figs. 4 and 7), vertical angles 42, 43 and 44 attached to one angle 41 and vertical angles 45, 46 and 47 attached to the other angle 41. Plates 48 and 49 are supported by base 40 and the vertical angles support a table plate 50 (Fig. 4). Angles 42 and 45 (Fig. 4) are tied together by bars 51 which support an electric motor M6 connected by a belt 53 (Figs. 4 and 7) with a pulley 54 which drives a shaft 55 connected by speed reducing gears (located in the interior of a housing 56) with a shaft 57 which drives a gear 58 meshing with a gear 59 which is connected with the driving member of a clutch 60.

This clutch may be a Hilliard single revolution clutch obtainable on the market. When this clutch engages, gear 59 is connected with a shaft 61 journaled in bearing brackets 62 and 63 supported by the plate 48. Clutch 60 is controlled by a disc 64 which, as shown in Fig. 9, is provided with a projection 65 which is received by a notch in a lever 66 pivotally supported at 67 by bracket 68 attached to the base 48. The tendency of clutch 60 is to rotate the shaft 61 counterclockwise as indicated by arrow 69 (Fig. 9) but this cannot occur so long as movement of disc 64 is prevented by the lever 66 when located in the position shown. When a rod 70 attached to lever 66 is pulled up so that the lever 66 is clear of projection 65 of disc 64, the clutch 60 automatically connects the gear 59 with the shaft 61. Upward movement of rod 70 is effected by a solenoid magnet or clutch solenoid marked CS in Fig. 4. Solenoid CS is energized to free the disc 64 so that the disc starts rotating with the clutch and shaft. Before the shaft has made one revolution, the solenoid is deenergized so as to permit the lever 66 to gravitate against the disc 64 so that its projection 65 will be caught by the lever at the end of one revolution. During one revolution of the shaft 61, one cycle of operation of the pill-making apparatus takes place.

Shaft 61 drives a cam 71 engaged by a follower roller 72 carried by a lever 73 pivoted at 74 on the base of an air valve 75 which is supported by a bracket 76 attached to the base 48. A movable member in the valve 75 is connected with a rod 77 connected at 78 with the lever 73 and urged upwardly by a spring 79 bearing against a washer 80 attached to the rod 77. Spring 79 normally urges the roller 72 against the cam 71. Valve 75 controls the admission of compressed air to one end or the other of a cylinder 81 whose piston (not shown) is connected with a rod 82 which passes through a bracket 83 attached to a slide 84 which moves upon the table 50 and is guided for such movement by rails 85 (Figs. 6 and 5). When the rod 82 moves left, a collar 86 thereon engages the bracket 83 to move the slide 84 toward the left in order to expose the open end of a briquetting cylinder 90 supported by the table 50. When the rod 82 moves right, nuts 87 attached to the left end of rod 82 force a spring 88 against the bracket 83 to force the slide 84 yieldingly toward the right far enough to cover the upper end of the cylinder 90.

The shaft 61 drives a cam 91 (Fig. 11) engaged by a roller 92 carried by a lever 93 pivotally supported at 94 on the frame of a valve 95 which is supported by a bracket 96 attached to the plate 48. Valve 95 is of the same construction as valve 75 (Fig. 9). Its operating member is connected with a rod 97 connected at 98 with lever 93 and urged upwardly by spring 99. Valve 95 controls the admission of the compressed air to one end or the other of a cylinder 100 mounted on the plate 49 (Figs. 4 and 7). Cylinder 100 encloses a piston 101 connected by rod 102 with a briquetting ram 103 closing the lower end of cylinder 90 and movable upward therein to compress the preheated molding material which has been received by the cylinder.

Shaft 61 drives a cam 111 (Fig. 10) engaged by follower roller 112 carried by lever 113 pivotally supported at 114 by the frame of a valve 115, supported by a bracket 116 attached to the plate 48. Lever 113 is connected at 118 with the valve operating member 117 which is urged downwardly by spring 119. The valve 115, which is constructed like the valves 95 and 75, controls the admission of compressed air to one end or the other of a cylinder 120 (Fig. 3) which is supported by a plate 121 supported by the vertical angles 42, 43, 45 and 46. A piston, not shown, within the cylinder 120 is connected with the rod 122 pivotally connected at 123 with a link 124 which is pivotally connected at 125 with a lever 420 which is connected to one of the two trunnions 412 which pivotally support a chute or funnel 410 (Fig. 3). When the funnel 410 is located vertically as shown in Figs. 3 and 4, and when the slide 84 is moved left to remove the upper end of cylinder 90, the material preheated by the doser, to be described, gravitates through the funnel into the briquetting cylinder 90.

The sequence of operations performed during one cycle, or 360° of rotation of the shaft 61 is shown diagrammatically in Fig. 12. Curves A, B and C represent respectively the operations performed by the three cams 111, 71 and 91. Referring to line A, between zero and 100° and between about 305° and 360°, the chute or funnel 410 is vertical. Between 150° and 270°, the chute is back or in inclined position 410' (Fig. 3). Line B shows that between zero and 100° and between 200° and 360°, the slide 84 is back and the cylinder 90 is open. Between 150° and 200°, the slide 84 is right and the cylinder is closed. While the cylinder 90 is open and while the chute is vertical, preheated material is being discharged through the chute into the cylinder 90. While cylinder 90 is closed by the slide 84, the ram rises to compress the preheated material therein as represented by line C between 150° and 190°. Then the ram descends and immediately thereafter the slide 84 moves left to open the cylinder 90 and then the ram ascends again as represented by line C between 235° and 270°. The ram remains up between 270° and 330° to locate the bottom of the pill just above the top of the table 50. While the pill is in that position, the chute or funnel 410 is moved from the back or inclined position 410' (Fig. 3) to the vertical position shown in Figs. 4 and 3. During this movement of the chute, the pill then located upon the ram just above the table 50, is engaged by plate 414 attached to the chute 410. Consequently the pill is pushed by the chute 410 from its position upon the top of the ram 103 to a position upon the table 50 to the right of cylinder 90. From this position the operator takes it and places it in the open injection cylinder 180 of a lower mold 170 at the loading station as indicated in Fig. 54.

When the doser and pill-maker units are used with two hydraulic presses LP and RP as represented in Fig. 54 by means of a control circuit to be described, these presses are caused to operate in overlapping cycles. This control includes switches which are under control by the shaft 61. Referring to Fig. 8, shaft 61 is connected by sprocket 130, chain 131 and sprocket 132 with a shaft 133 supported by a bracket 134 attached to the base 48. Shaft 133 drives a cam 135 clockwise (arrow 136, Fig. 8) or counter-clockwise as viewed in the direction of arrow 138 (Fig. 7) which is in the direction in which the cams shown in Figs. 9, 10 and 11 are viewed. The cam 135 is engaged by rollers 140 and 141 carried by plungers 142 and 143, respectively, which operate switches SW7 and SW8 in a particular manner for a purpose to be described later.

Doser

The doser or apparatus for preheating the molding material comprises a bracket 300 attached to frames 301 and 302 (Figs. 1, 13, 14, 15, 17) which provide bearing holder half-shells 303 which support bearings 304 retained by bearing holder caps 305 attached to part 303. Bearings 304 support a shaft 306 connected by couplings 307 and 308 with a shaft 309 passing through an oil seal 310 and journaled in bearings 311 and 312, supported respectively by a plate 314 and a gear housing 315 and a plate 316 which are attached together, the housing 315 being integral with a bracket 317 attached to frame 301 which supports another bracket 318 attached to housing 315. Housing 315 encloses a worm gear 320 attached to shaft 309 and a worm 321 meshing with gear 320 and integral with a shaft 322 which is supported by bearings 323 and 324 (Fig. 15) carried respectively by a cap 326 and housing 315 and extending through an oil seal 325 in a cap 327. Shaft 322 is connected with a pulley 330 which a belt 331 connects with a pulley 332 on the shaft 333 of a motor M5 which is supported by a table 335 having ears 336 which a rod 337 pivotally connects with ears 338 of a bracket 339 which is supported by the angles 42, 43, 45 and 46. The belt 331 is tightened by turning a screw 340 threaded through bracket 339 and engaging the table 335, the screw 340 being fixed by a lock nut 341 (Fig. 13). So long as motor M5 operates, the shaft 306 rotates.

Shaft 306 supports and c ives a heated steel cylinder 350 having a polished chromium surface on which the molding material is deposited and heated. Cylinder 350 is driven by pins 351 connected with a collar 352 welded to the shaft 306. The ends of cylinder 350 are thermally insulated by transite rings 353, 354 and 355 in direct engagement with the cylinder 350 which supports also a transite ring 356 and disc 357 which enclose electrical connectors comprising copper rings 358 and 359, which wires 360 and 361 respectively connect with collector rings 362 and 363 and a wire 364 connected with ring 365 and with a thermal switch 366 in the cylinder 350. Rings 358 and 359 are connected respectively with the terminals of heating elements 367 as shown in Fig. 17. Collector rings 362, 363 and 365 are supported by and driven by shaft 306 and are insulated therefrom by discs 368, 369 and 370 clamped between washers 371 and 372 by a nut 373 threaded on shaft 306. Rings 362, 363 and 365 are engaged by brushes 374, 375 and 376 respectively supported by non-conducting blocks 377 and 378 supported by a bracket 379 attached to frame 302 (Fig. 22). The control of current flowing to the heaters is disclosed in the application Serial No. 774,592.

The frames 301 and 302 together with the bracket 300 and a bar 380 (attached to frames 301 and 302) provide a pocket for a hopper 381 having ribs 382 and 383 (Fig. 1) received by grooved bars 384 and 385 respectively, attached to frames 301 and 302 respectively. These ribs bottom in the lower ends of the grooves of the bars to support the hopper. The molding material gravitates through an opening 386 (Fig. 21) in the bottom of the hopper and between a flange 387 provided by the hopper rear wall and a flange 388 of a plate 389 attached to lugs 390 pivoted on studs 391 attached to the hopper side walls. Plate 389 has ears 392. Through the arcuate slots 393 thereof there pass screws 394 threaded into the housing side walls. By loosening the screws 394, the flange 388 can be adjusted vertically to determine the thickness of the layer of material deposited upon a spreader or doser roller 400.

Spreader roller 400 is straight knurled longitudinally with V-grooves about $\frac{1}{32}''$ deep. It rotates counterclockwise (Fig. 21) and carries the molding material from between the flanges 387 and 388 and drops it upon the heated cylinder 350 in an even layer. As the cylinder 350 rotates counterclockwise, the material is heated and it softens sufficiently to cause the particles to stick together or to the roller so that it does not drop from the roller until removed by a scraper 401 clamped by a bar 402 (Fig. 29) against a bar 403 attached to arms 404 pivoted on pins 405 supported by frames 301 and 302 (Fig. 28). Springs 406, connecting studs 407 on these frames with studs 408 on the arms 404, urge the scraper 401 against the cylinder 350.

The material removed by the scraper gravitates into a funnel 410 attached to arms 411 (Fig. 22) attached to trunnions pivotally supported by frames 301 and 302. As shown in Fig. 25, one of the arms 411 is attached to a trunnion or shaft 412 journaled in a bearing 413 supported by frame 302 and a ring 414. A pin 415 attaches the shaft 412 to the lever 420 which is connected by rod 124 with rod 122 of a piston in cylinder 120 (Fig. 3).

The cylinder 350 is engaged by a cleaner bar 425, preferably of laminated cloth with a Bakelite binder. Bar 425 is clamped by a bar 426 (Fig. 27) against a bar 427 having arms 428 pivotally supported on pins or screw studs 429 attached to frames 301 and 302. Each arm 428 is welded to a bar 430 carrying a stud 431 engaged by a hook 432 on a rod 433 which, as shown in Fig. 31, passes through a tube 434 attached to a frame 301 or 302, and is threaded into a nut 435. A spring 436 located between the nut 435 and a shoulder 437 of the tube urges the rod 433 upwardly to force the cleaner bar 425 against the cylinder. Thus the cylinder presents a clean surface to the fresh deposit of molding material. This minimizes the possibility of delivery to the mold of any material which is cured beyond the predetermined stage of partial cure which the cylinder 350 is intended to accomplish.

The cylinder 350 and material carried thereby and dropping therefrom are enclosed by the side frames, a bar 440 (Fig. 21) attached thereto and a cover 441 attached to lugs 442 pivotally supported by pins 443 attached to the side frames. A bar 444 connects the bottom rear edges of the side frames.

The amount of the charge of molding material for a mold is determined in part by the distance of the flange 388 (Fig. 21) above the roller 400 and by the duration of rotation of the roller 400. The transfer of material by the roller to the cylinder 350 is called dosing. The apparatus which controls the duration of rotation of roller 400 during each cycle of operation is automatically controlled in a manner to be described.

Referring to Fig. 17, bearings 450 supported by the frames 301 and 302 and retained by rings 450a support the roller 400 which carries a pin 451 connected with a clutch part 452 having teeth 453 engageable with similar teeth of a shiftable clutch part 454 attached to a gear 455 meshing with a gear 456 meshing with a gear 457 integral with coupling 308. Gear 456 is pivoted on a rod 458 (Fig. 16) attached to a bracket 459 supported by gear housing bracket 317 (Fig. 17). Gear 456 is retained by a washer 460 and a screw 461 threaded into rod 458. A groove 465 in clutch part 454 receives pins 466 of a yoke 467 welded to arms 468 and 469. Arm 438 is pivoted on a screw 470 threaded into bracket 317 and has a hole 471 (Fig. 30) which receives a screw 472 threaded into frame 301 and retained in the required position of adjustment by a nut 473. The head of screw 472 limits counterclockwise rotation of arm 468 under the effect of a compression spring 474 located between arm 469 and frame 301 and retained by pins 475 in each. Arm 469 is connected by pin 476, link 477 and pin 478 with the armature 479 of a solenoid DS. When solenoid DS is energized, the clutch parts 452 and 454 are connected; and, when solenoid DS is deenergized, the spring 474 separates these clutch parts and the shaft 400 stops practically immediately because a brake is always effective. This brake, shown in Fig. 19, comprises a drum 485 engaged by a split band 486 having a hole 487 which receives a locating screw 488. The band is urged against the drum by a spring 489 pushing against a washer 490 and the latter against the head of a screw 491 threaded into a nut 491a which is urged by the spring 489 against one part of the band while the spring pushes directly against the other part of the band.

Above the hopper 381, there is located a larger supply hopper 495 (Fig. 2) hingedly connected at 496 with a post 497 welded to a plate 498 which is attached to the plate 339. The discharge opening 499a (Fig. 1) of the hopper 495 is normally closed by a movable plate 499 (Fig. 2). When the hopper 495 is being filled, it can be swung upon its hinges clear of the dosing apparatus.

*One-man operated molding equipment*

Fig. 54 shows diagrammatically a molding equipment capable of being operated by one operator. It comprises a left molding press LP, a right molding press RP and the doser and pillmaker unit which has been described. The presses are constructed and hydraulically operated as described in the copending applications referred to. Briefly, each press comprises a base 150 (Fig. 51), supporting posts 151 and 152 which support a plate 153 supporting a cylinder 154 containing a piston 155 connected by rod 156 with a movable plate or press head 157. Head 157 supports an upper mold 160 which provides die cavities, one of which is indicated at 161. One or more knockout pins 162 extend into each die cavity, these pins being attached to pin plates 163 carried by an ejector bar 164 to which is attached a push-back pin 165. Bar 164 is urged downwardly by springs 158 which presses upon plungers 159.

The upper mold 160 is engageable with either of the two lower molds 170 supported by a turret or table 171 which is rotatable upon the post 151 and is supported by a step bearing 172 supported by a frame 173. Each lower mold 170 has die cavities 174 into which one or more knockout pins 175 can extend. Rods 175 are attached to pin plates 176 carried by an ejector plate 177 to which push-back pins 178 aligned with pins 165 are operatively connected. Each lower mold has a compression chamber or cylinder 180 which receives a ram 181 attached to a rod 182 having a head 183 provided with a T-slot capable of receiving the T-head member 184 or the T-head member 185. T-head member 184 is connected by rod 186 with a piston 187 carried by a cylinder 188 supported by base 150. T-head member 185 is connected by rod 189 with a piston 190 operating in a cylinder 191 supported by base 150.

The table 171 is indexed or turned 180° intermittently by an hydraulic servo comprising a cylinder 200 containing a piston 201 (Fig. 52) connected by rod 202 with a rack 203 meshing with a gear 204 which drives a gear 205 meshing with a gear 206 which, as shown in Fig. 51, is provided by the hub of table 171. The admission of pressure fluid to either end of cylinder 200 is controlled by valve 210 including a shell 211 having a port 212 with which a pressure oil inlet pipe $u$ is connected, ports 213 and 214 which are respectively connected by pipes $s$ and $t$ with the ends of the cylinder 200 and with exhaust ports 215 and 216 which are connected together by a pipe $r$ leading to an oil supply tank. The shell 211 receives a rotatable valve 217 which as shown in Fig. 53, is connected by shaft 218 with a disc 219 provided with teeth 220. The teeth 220 are intermittently engaged by a finger 221 pivotally connected at 222 with a bar 223 having a surface 224 which prevents clockwise rotation of the finger 221 from the position shown in which it is located by plunger 225 urged left by spring 226 located in the bar 223. Bar 223 has an inclined surface 227 which will allow the finger 221 to move counterclockwise. Bar 223 is connected by a rod 229 with a piston 230 received by a cylinder 231, the ends of which are connected with pipes $q$ and $p$ forming a part of the hydraulic system of Fig. 34 to be described.

When valve 217 is in the position shown, pressure fluid will flow from pipe $u$ to pipe $s$ thereby causing piston 201 to move right in order to effect 180° revolution of the table 171. In order to move the table in the opposite direction, it is necessary to reverse the connections made by the valve 210. This is done when the valve member 217 is moved 45° clockwise since pipe $t$ will then be connected with pipe $u$ and pipe $s$ will be connected with pipe $r$.

The valve 217 is moved 45° clockwise each time the piston 230 (Fig. 53) moves left. Left movement of piston 230 causes the finger 221 to engage points 220 of disc 219 and to move the disc 45° clockwise. When the piston 230 moves right to its starting position, the finger 221 merely rides over a point 220 without imparting any motion thereto, since counterclockwise rotation of the disc 219 is prevented by a pawl 232 pivoted at 233 and which successively engages the points 220 of disc 219.

The cycle of the press starts at the completion of indexing of table 171. By controls to be described, the piston 155 descends and forces the upper mold 160 against the lower mold 170 which is then underneath. A piston 187 then rises to elevate the ram 181 thereby causing the material in the cylinder 180 to be forced through runners in the mold cavities 161 of the upper mold and mold cavities 174 of the lower mold; and curing of the material takes place under heat and pressure, said molds being heated by electrical units not shown. After the lapse of a predetermined time, controlled in the manner to be described, the ram 181 descends to the position shown in Fig. 51 and the upper mold 160 starts rising above the lower mold; and the springs 158 expand to cause the pins 162 to move down relative to the mold 160 to strip the molded pieces therefrom. When upward movement of the mold 160 ceases, the table 171 is indexed to carry the right-hand mold 170 charged with material to the curing station and the left-hand mold 170 to the loading station. When the table 171 indexes, the T-slotted head 183 connected with the ram 181 of right mold 170 disconnects from the T-head 185 and connects with the T-head 184 associated with piston 187; and the T-slotted head 183 associated with the left mold 170 in which the material has been cured disconnects from T-head 184 and connects with the T-head 185. At the completion of the indexing, the operator presses the pedal 575 to operate a valve 580 which causes the piston 190 in cylinder 191 to rise a distance sufficient to cause the T-slotted member 183 then connected therewith to lift the ejector plate 177 so that the knockout pins 175 will eject the work from the mold 174.

After the work is ejected from the mold at the loading station, the operator releases the pedal 575 to permit the valve 580 to return to its normal status whereupon the piston 190 moves down to lower the ram 181 which engages the plate 177 to force it down. The die cavities 174 are then cleaned by compressed air and inserts, if required, are loaded. Then the molding material is placed in the cylinder 180 at a time prior to the next indexing of the table.

In Figs. 34 through 50 which illustrate the hydraulic system, reference letter T refers in each case, to a return pipe leading to an oil tank from which the pumps P1 and P2 withdraw oil and force it through the system. Before the operation of the hydraulic system is described, there follows a description of certain valve units.

Valve 500 (Figs. 35 and 36) comprises a movable valve 501 which, as shown in Fig. 35, normally blocks the connection between pipes $a$ and $b$. Then the pump P1 cannot force liquid through the pipe $a$. A pressure relief unit $aa$, associated with the pump, then operates to relieve the loading of the pump. The pump has a high pressure stage and a low pressure stage. While the valve 500 is closed, a relief valve in unit $aa$ opens at a certain pressure to relieve the high pressure stage. Another relief valve opens to reduce the low pressure stage to a very low value. The pumped liquid which cannot flow through the pipe $a$ returns to the tank through a pipe $pt$ having a restriction sufficient to produce about 50 pounds back pressure which is sufficient to cause some of the liquid to be forced through a heat exchanger and a filter not shown. As shown in Fig. 36, valve 501 has moved left to connect pipe $a$ with pipe $b$. This is effected by pressure oil entering through $a'$ when valve 504 shown up in Fig. 35, moves down into the position shown in Fig. 36. Downward movement of valve 504 against the action of a spring 503 is effected by downward movement of an armature 502 when solenoid coil SS is energized. Coil SS is the safety solenoid.

Figs. 37 and 38 show a valve unit 510 having a movable valve 511 which, as shown in Fig. 37, connects $b$ with $f$ but blocks connection between $b$ and $c$ which is connected with T. In Fig. 38, $f$ is blocked from $b$ and is connected with T, and $b$ is connected with $c$. Movement of valve 511 into the position shown in Fig. 38, is effected by oil pressure entering pipe $v$ (connected with $a'$, Fig. 34) when a valve 512 moves down to the position shown in Fig. 38. This movement is effected against the action of spring 513 by downward movement of an armature 514 when a solenoid coil MS is energized. This coil is energized automatically following the indexing operation. The connection between pipe $a'$ and pipe $v$ is controlled by a safety valve unit 591 which, as shown in Fig. 38A, has a movable valve member 592 urged right by a spring 593 to cause a roller 594 carried by the valve to be received by either of two diametrically opposite notches 595 in a ring 596 which rotates with the conveyor table. While the table is being indexed, pipe $v$ will be connected with drain T. At the end of the indexing of the table, pipe $v$ is connected with pipe $a'$. Therefore valve unit 591 makes it certain that the valve member 511 of unit 510 will not move to the position shown in Fig. 38 until indexing has been completed. Ring 596 is attached to the table 171.

Figs. 39 and 40 show a valve unit 520. In Fig. 39 movable valve element 521 is in position for blocking pipe $j$, from $c$ and $d$ which are always connected through the unit 520. In Fig. 40, valve 521 has moved into position for connecting $c$ with $d$ and also with $j$. Movement of valve 521 into the position shown in Fig. 40 against the action of a spring 524 (adjusted by screw 525) is effected by pressure oil entering the pipe $x$ when the pressure in $x$ builds up to a value such as to overcome the spring 524, check valve 522 permits flow from $j$ to $c$. Valve 520 responds to pressure above the clamp piston 155 after it has lowered to cause the ram piston 187 to rise.

Figs. 41 and 42 show a valve unit 530 having a movable valve 531 held down in Fig. 41 by spring 534 (adjusted by screw 535) and movable up into the position shown in Fig. 42 by oil under pressure entering pipe $y$ when said pressure has attained a value such as to overcome the spring 534. In Fig. 41 valve 530 blocks flow from $e$ (also $w$ and $x$) to $d$. Flow from $d$ to $e$ is permitted by check valve 532. In Fig. 42, valve 531 is located to permit flow from $e$ to $d$. Valve 530 responds to pressure above ram piston 155 after it has lowered to open $e$ to drain so that clamp piston 187 can rise.

Fig. 43 shows a sequence valve 560 connected as shown in Fig. 44 between $g'$ and $g''$. There can be flow from $g''$ to $g'$ past check valve 562, but not from $g'$ to $g''$ unless valve 561 moves up from the position shown when the pressure in $g'$ is great enough to raise piston 563 and valve 561 against the action of spring 564 adjusted by screws 565.

Figs. 44 and 45 show a valve unit 550 having a movable valve member 551 held in the position shown in Fig. 44 by a spring 552 and movable to the position shown in Fig. 45 by pressure oil entering from the pipe $g''$. When the valve 551 is in the position shown in Fig. 44, pipes $h$ and $g$ are connected together and pipe $q$ is connected with drain T. When valve 551 is in the position shown in Fig. 45, $h$ is connected with drain T and $g$ is connected with $q$. Valve 550, controlled by valve 560, responds to pressure underneath clamp piston 155 after it has risen, to relieve pressure above ram piston 187 and above ejection piston 200a and to cause the indexing of the table through the action of piston 270a which reverses valve 260.

Figs. 46 and 47 show a valve unit 570 having a valve member 561 held in upper position by a spring 572 but movable down into a position as shown in Fig. 47 by oil pressure entering pipe $k$. When valve 561 is located in the position shown in Fig. 46, $m$ is connected with $l$ and $o$ is connected with T. When valve 561 moves down to the position shown in Fig. 47, $l$ is connected with T and $m$ is connected with $o$. Valve 570 withholds connection of the upper end of ejection cylinder 191 with drain until the ram piston 187 has risen when pressure below the piston 187 causes valve 570 to connect pipes $m$ and $o$ so that the ejection piston 190 can be caused to rise when valve 580 is lifted by the pedal 575. After solenoid MS is deenergized and valve 510 is conditioned as shown in Fig. 37 and before the clamp piston 155 has risen and before valve 550 is conditioned as shown in Fig. 45, pipe $k$ then having no pressure, valve 570 is conditioned as shown in Fig. 45; and, because pipe $h$ then has pressure and $l$ and $m$ are then connected by valve 570, ejection piston 190 will move down automatically independently of the release pedal 575 to permit valve 580 to lower, pipe $p$ then having no pressure when pipe $c$ is connected with drain by valve 510. Therefore, valve 570 provides for lowering the injection piston automatically before indexing takes place and before the doser discharges material into the die at the loading station.

Figs. 48 and 49 show a valve unit 580 having a valve member 581 held down by a spring 583 as shown in Fig. 48 but movable to an upper position by a pedal 575 (Fig. 34) pivoted at 576 and engageable with a roller 582 attached to member 581. When valve 571 is down as shown in Fig. 48, $p$ is connected with $o$ and $n$ is connected with T. When valve 571 is up as shown in Fig. 49, pipe $o$ is connected with T and $n$ is connected with pipe $p$.

Fig. 50 shows a sequence valve unit 600 which normally blocks pipe 599 from T until the pressure in pipe $y$ is sufficient to raise a piston 603 and a valve member 601 against the action of a spring 604 adjusted by a screw 605.

The system will operate provided safety solenoid SS is energized so that valve 501 of unit 500 is in the position shown in Fig. 36 to connect pipes $a$ and $b$ so that pump P1 is connected by pipes $a$ and $b$ and by valve unit 510 when in the status shown in Fig. 37 with pipe $f$ in order to elevate piston 155 of clamp cylinder 154. As will be explained later, piston 155 does not start to rise until a pressure has been built up in pipes $f$ and $y$ sufficient to move valve 531 of unit 530 into the position shown in Fig. 42 so that the oil above piston 155 can escape from $e$ through valve 530 to $d$ and thence through valve unit 520 to pipe $c$ and thence through valve unit 510 to drain T. Piston 155 does not move up until after piston 187 of shot cylinder 188 moves down. Piston 187 moves down since pressure is delivered by pump P1 through $a$, unit 500, $b$, unit 510 in the status shown in Fig. 37, pipe $f$, pipe $g$, valve unit 550 when in the status shown in Fig. 44, pipe $h$. Oil escapes from the bottom of cylinder 190 through pipe $j$ past check valve 522 of unit 520, to $c$ and to T of unit 510 in the status shown in Fig. 37. It is after the shot cylinder piston 187 has moved down to the bottom cylinder 190 that pressure builds up in $h$, $g$, $f$ and $y$ to such extent that valve 531 of unit 530 can move up to the position as shown in Fig. 42 so that $e$ will be connected with $d$ and hence through unit 520 with $c$ and to T of unit 510, so that the piston 187 can move up.

Fig. 34 shows index piston 201 at the right end of its cylinder 200. The left end of the cylinder 160 receives pressure oil from pipe $b$ through pipe

*u* (including check valve *cv*) through reversing valve 210 and pipe *s*. The right end of the cylinder 200 is connected with drain through *t*, the reversing valve 210, pipe *r*, valves 240 and 595 which lead to a drain T through a sequence valve 600 provided the pressure in *y* is sufficient.

Fig. 34 shows knockout piston 190 at the bottom of its cylinder 191. Piston 190 had been moved to that position by oil pressure from pipe *c*, pipe *p*, valve 580 when in the status shown in Fig. 48, pipe *o*, valve 570 when in the status shown in Fig. 47 and pipe *m*. The lower end of the cylinder 191 is connected with drain through pipe *n*, valve unit 580 when in the status shown in Fig. 48, and drain T. After knockout piston 190 had moved down, the pressure above the piston 190 and above shot piston 187 is automatically relieved as the result of a movement of valve member 551 of unit 550 into the status shown in Fig. 45 as result of a pressure in pipe *g"*, which pressure builds up sufficiently after piston 155 of clamp cylinder 154 has arrived at the top of said cylinder. Then *h* is connected with drain T of unit 550 (in status shown in Fig. 45) and there is no pressure above piston 187 as well as no pressure below it. The upper end of cylinder 191 is connected through *m*, valve unit 570 (in status shown in Fig. 46), *l* and *h*. Therefore, there is no pressure above piston 190 as well as no pressure below it. Thus the pressure at the couplings between the ram rods 182 of the lower molds and the shot piston and the knockout piston is relieved, and indexing can take place without frictional resistance due to these connections.

Assuming that clamp piston 155 has just risen to separate the dies as a result of deenergization of the solenoid MS as a result of build-up of pressure in *g"* following the stopping of piston 155, valve 550 becomes conditioned as shown in Fig. 45 to connect *g* with *q* thereby causing piston 230 to move right from the position shown in Fig. 34 while the exhaust from the right end of the cylinder 231 drains out through *p*, unit 580 (as in Fig. 48) *o*, unit 570 (as in Fig. 46), T or to C and out through drain T of unit 510. This causes the reversing valve 210 to reverse thereby connecting *u* from *b* to pipe T which causes piston 201 to move left while the left end of cylinder 200 is connected through drain to pipe *s*, *r* and valve units 240 and line 599 and valve 600 to drain. Movement of piston 200 left causes the table to be indexed to carry a lower mold 170 containing molded material to the unloading station and movement of a charged lower mold 170 to the molding station under the upper mold 160.

Following indexing, the mold solenoid MS of valve 510 is energized by means to be described and valve 510 is in the status shown in Fig. 38. Pump P1 is then connected through pipe *a*, unit 500, pipe *b*, unit 510, pipe *c*, unit 520, pipe *d* through check valve 532 of unit 530, pipe *e* connected with the upper end of cylinder 154. The piston 155 moves down and the lower end of cylinder 154 being connected with drain through *f* and with drain T of unit 510. At the end of down travel of piston 155, check valve 532 closes. Pump P2 supplies relatively high pressure to pipe *e* through a pressure control valve 540 a check valve *w'* and a pipe *w* connected with pipe *e*. This high pressure is determined by the setting of the pressure relief valve 540.

When the pressure against the upper side of the piston 155 reaches the maximum, the pressure communicated from *e* to valve 520 through pipe *x* will cause the valve 521 to move to the position shown in Fig. 40, thereby connecting *e* with *j* so that the pump P1 will be then connected with the lower end of shot cylinder 188 (pump P2 is blocked from *d* and *c* by check valve 532 of unit 530) to cause its piston 187 to move up, thereby effecting upward movement of the compression ram 181 to force molding material into the die cavities.

After the piston 187 of the shot cylinder reaches the top, pressure builds up in pipe *k* to cause valve 571 of unit 570 to move down into the position shown in Fig. 47 in order to connect pipes *m* and *o*. When pedal 575 is depressed to cause valve 581 of unit 580 to move into the position shown in Fig. 49, *p* is connected with *n* leading into the lower end of knockout cylinder 191. Check valve 590 blocks flow from *p* to *z* and directly to cylinder 191. Piston 190 rises, the upper end of the piston being connected with drain through *m*, unit 570 (in the status shown in Fig. 47), pipe *o* and drain pipe T of unit 586 (then in the status shown in Fig. 49). When pedal 575 is released, piston 190 goes down because pipe *p* is connected by unit 580 (as in Fig. 48) to *o*, to *m* by unit 570 (as in Fig. 47), to the top of cylinder 191 while the bottom of the cylinder is connected through *n* and drain T of unit 580 (as in Fig. 48).

At the end of a certain time, mold solenoid MS of unit 510 is deenergized by means to be described and valve 510 returns to the status shown in Fig. 37, thereby disconnecting *b* from *c* and connecting *c* with drain T. Pipe *b* is connected with pipe *f*, therefore oil flows from pump P1 through pipes *f* and *g*. Just then oil cannot flow out from the top of cylinder 154 because check valve 532 of unit 530 will close and the unit 530 is just then in the position shown in Fig. 41 which blocks *e* from *d*. Therefore, since *h* is connected with *g* through unit 550 (then in the status shown in Fig. 44), the shot cylinder piston 187 will move down first since the pressure in moving it down is not built up in *y* to a value such as to overcome spring 534 of unit 530. The bottom of cylinder 188 is connected with drain T of unit 510, through *j*, unit 520, *c* and unit 510. After shot cylinder piston 187 has bottomed on the cylinder, pressure in *y* builds up to raise valve 531 of unit 530 to the position shown in Fig. 42. The top of cylinder 154 is then connected with drain T of unit 510 through *e*, unit 530, *d*, unit 520, *c*, unit 510 in the status shown in Fig. 37. Therefore piston 155 moves up after piston 187 has moved down. After piston 155 has moved up, pressure in *f*, *g*, *g'* builds up to where unit 560 permits flow through *g"* to unit 550 to cause its valve 551 to move to the position shown in Fig. 45. Therefore, after piston 155 moves up, *h* becomes connected with T of unit 550 and there is no pressure above piston 187 as well as no pressure below it. Since *l* is connected with *h*, and *l* with *m* through unit 570 (in status shown in Fig. 46 since there is no pressure in *k*, *j* being connected with drain T of unit 510 through check valve 522 of unit 520, *c*, and unit 510) there is no pressure above the piston 190 as well as no pressure below it, pressure in *p* having practically ceased when *c* becomes connected with T of unit 510. Although the operator should fail to release pedal 575, the bottom of cylinder 200 can drain through *z*, check valve 590 and *p* to *c* and *t* of unit 510. Then there is no pressure on either side of the pistons 187 and 190 and friction at the T-slot connections is relieved.

When following the movement of shot cylinder piston 187 down, the pressure in $y$ builds up to such extent as to lift the valve 531 of unit 530, pipe $w$ is connected with $d$. Therefore the pump P2 can pump to drain through $w$ and to $d$, valve 520, $c$ and T of valve 510.

When valve 551 is in the position shown in Fig. 45, there is pressure in $q$ to effect movement of the piston 230 to turn the reversing valve 210. Return of piston 230 from a right position back to the left position shown in Fig. 34, or from left to right in Fig. 53, is effected later when the pressure is applied again to pipe $p$.

When valve 210 is reversed, the piston 201 in the index cylinder 200 moves left by pressure received from $b$ through $u$ and $t$; and pipe $s$ is then connected with drain T of unit 600 through the flow control valve 240 which starts to close at about 50% of the index stroke, thereby slowing down the indexing so that the table rack will come to a stop without too much shock against the positive stops which limit its strokes. In shunt with valve 240, there is a relief valve 595 which by-passes a few drops of oil from the exhaust line 599 in order to prevent hydraulic shock.

Each of the copending applications referred to disclose, in association with a single press, a preheating apparatus which provides for loading the compression cylinder 180 with the required amount of preheated molding material. The equipment shown in Fig. 54, however, includes a single doser (preheater) and pill-maker unit which serves two presses which operate alternately in overlapping cycles. This unit provides pills of preheated molding material alternately to suit the requirements of the presses. The apparatus for controlling the presses, and the dosing and pill-making unit will now be described with reference to Figs. 55-57.

Referring to Fig. 56, the pump motors M1 and M2 of the left press are controlled by switch SW9 which is closed by energization of coil 33$l$; and the pump motors M3 and M4 of the right press are controlled by switch SW10 which is closed by energization of coil 33$r$. Coils 33$l$ and 33$r$ are connected with secondary 202 (Fig. 55) of transformer 200 (whose primary 201 is connected with an A. C. source) by line 1, switch SW5 (when closed), SW6 (normally closed) line 4, line 10, contacts 10b and 10a of left press control switch OSL and right press control switch OSR, respectively, lines L8 and R8, respectively, to coils 33$l$ and 33$r$, respectively, and thence through line 3 to transformer secondary 202. Switches SW9 and SW10, when closed, by-pass switch SW5 through connections made between lines 1 and 4 by contacts 34$l$ and 33$r$, respectively. Switch SW5 can then be released because coils 33$l$ and 33$r$ remain in circuit. The press motors are all stopped by opening switch SW6 (Fig. 55, upper right). Motors M1 and M2 stop when switch OSL is opened or when any of their associated thermal overload circuit breakers $ts$ (Fig. 56) open. Motors M3 and M4 stop when switch OSR is opened or when any of their associated thermal overload circuit breakers $ts$ open.

Doser motor M5 and pill motor M6 are controlled by switch SW13 whose magnet coil 38 is connected with the transformer secondary 202 in the following manner: line 3, coil 38, four thermal overload circuit breakers $ts$ in series, line 10, switch SW6, line 4, contacts 34$l$ and 34$r$ in parallel to line 1. When switch SW6 is opened, switches SW9 and SW10 open, and motors M5 and M6 stop. If only one of the switches SW9 or SW10 open, motors M5 and M6 remain in operation. Hence the doser and pill-maker can operate for one of the presses if desired. If coil 38 of switch SW13 is open-circuited by reason of opening of any of the associated thermal overload switches $ts$, the doser and pill motors stop.

If switch OSL (Fig. 55) is opened, the left press will stop cycling and there will be no operation of the doser and pill-maker for that press. If switch OSL is closed and switch DSL is opened, the left press will cycle without operation of the doser and pill-maker for its benefit. Similarly, if switch OSR is opened, the right press will stop cycling and there will be no operation of the doser and pill-maker for that press. If switch OSR is closed and switch DSR is opened, the right press will cycle without operation of the doser and pill-maker for its benefit.

The complete cycle of all the apparatus can be started by closing of either of the conveniently located switches SW3 or SW4, thereby establishing the following circuit: line 1, line 16, switches SW1 and SW2 in series, line 29, coil MCRc of main control relay MCR, line 3. Relay MCR closes 1a and 16a to by-pass switches SW3 and SW4 so that relay MCR will remain closed after SW3 or SW4 are released. The complete cycle is stopped by opening either of the conveniently located switches SW1 or SW2. Lamp SL indicates by burning that the complete cycle has been started. Relay MCR remains closed so long as complete cycling is desired. It connects lines 3 and 9 through its contacts 3c and 9c.

The complete cycle comprises six periods (items I and II, Fig. 57) namely: A, timing by the cure timer; B, timing by the right doser timer during which the doser heats material for the pill to be used by the right press; C, the material heated during B is briquetted into a pill for the right press; D, timing by the cure timer; E, timing by the left doser timer during which the doser heats material for the pill to be used by the left press; and F, the material heated during E is briquetted into a pill for the left press.

The left press (item XIII) cures during periods A, B, C, D, E and F. The right press (item XIV) cures during periods D, E, F, A, B and C. At the beginning of A and just before left press curing starts, the left table indexes (item III). During left table indexing, left table switch TSL (item IV) connects lines L8 and L5; and, after indexing, it connects lines L8 and L7. At the beginning of D and just before right press curing starts, the right table indexes (item V). During right table indexing, right table switch TSR (item VI) connects lines R8 and R5; and, after indexing, it connects lines R8 and R7. Table switches like switches TSL and TSR are disclosed in the copending applications referred to. In Fig. 51, the table switch is marked TS.

Switch SW7 (item VII) and switch SW8 (item VIII) which are shown in Fig. 8 respectively connect lines 16 and 17 and lines 16 and 12 during periods A, B and C and respectively connect lines 16 and 18 and lines 16 and 11 during periods D, E and F.

Items IX, X, XI and XII of Fig. 57 show respectively the times when relays L3, L1, R3 and R1 of Fig. 55 are open and closed.

Left press curing (item XIII) takes place during energization of solenoid MSL (Fig. 56, left).

Right press curing (item XIV) takes place during energization of solenoid MSR (Fig. 56, right).

The left press doser timer (Fig. 55, left) has a timer motor ML, a reset magnet coil rsL, a switch 19a engaging contact 22a while the timer is timing-out and shifting to contact 20a when the timer times-out and returning to 22a when coil rsL is energized to reset the timer. This left press doser timer is reset at the end of period F (item XV, Fig. 57).

The right press doser timer (Fig. 55, right) has a timer motor MR, a reset magnet coil rsR, a switch 13c engaging a contact 28c while the timer is timing-out and shifting to contact 20b when the timer times-out and returning to 28c when coil rsR is energized to reset the timer. This right press doser timer is reset at the end of period C (item XVI, Fig. 57).

At Fig. 55, center, the cure timer is represented. It has a timer motor MC, a reset magnet coil rs and a switch 15a which, during timing of the timer, makes no connection and which, when the cure timer times out, engages 14a and separates from 14a when the cure timer is reset by energizing the coil rs.

At the end of periods B and E when the right doser timer and the left doser timer, respectively, times out, relay TD closes (item XVII, Fig. 57) and effects brief energization of the clutch solenoid CS to cause the pill-maker clutch to be engaged for one revolution to cause operations of the pill-maker during periods C and F.

The following description is given of the circuit connections made during the cycle which is assumed to begin with period A and to end with period F. At the end of period F, switch SW7 connects lines 16 and 17. Coil L3c of relay L3 is energized through the following circuit: 3 to 9 through relay MCR, L3c, L5 to L8 through switch TSL when the left table indexes, L8 to 10 through switch OSL, 10 to 4 through switch SW6, 4 to 1 through switch SW9 (Fig. 56). Relay L3 closes and connects L3c with line 17. Then the circuit of coil L3c is: 3 to 9 through relay MCR, L3c, 17 to 16 through switch SW7, 16 to 1 through relay MCR. Relay L3 stays closed after switch TSL disconnects L8 from L5 and connects L8 with L7. Relay L3 connects 6L and 7L connects contacts 6L and 7L. Period A begins when the cure timer motor MC receives current through the following circuit: 1 to 16 through relay MCR, 16 to 12 through switch SW8, 12 to 15 through relay R1 (then closed as will be described later), timer motor Mc, line 9 to line 3 through relay MCR. The cure timer starts timing. The mold solenoid MSL which starts the left press is energized through the following circuit: line 1 to 4 through switch SW9 (Fig. 56), line 4 to 10 through switch SW6, line 10 to line L8 through switch OSL, line L8 to line L7 through left table switch TSL which connects with 7' at the end of indexing, line L7 to line L6 through relay L3, the left mold solenoid MSL, line L2 to line 9 through switch SW11, line 9 to line 3 through relay MCR. The upper mold of the left press descends upon the left press lower mold under it and the ram of said lower mold ascends to cause the molding material in the injection cylinder to be forced into the mold cavities; and curing in the left press starts under heat and pressure.

The cure timer times out and causes its contact 15a to connect with 14a. Motor MR of the right press doser timer receives current through the following circuit: 3 to 9 through relay MCR, MR, 13 to 14 through relay R1 (then closed), 14 to 15 through the cure timer (then timed out), 15 to 12 through relay R1, 12 to 16 through switch SW8, 16 to 1 through relay MCR. The right press doser timer starts timing and period B begins. Doser solenoid DS receives current through the following circuit: 3 to 9 through relay MCR, solenoid DS, 25 to 26 through switch OSR, 26 to 27 through switch DSR, 27 to 28 through relay R1, 28 to 13 through the right press doser timer contacts 28c and 13c, 13 to 14 through relay R1, 14 to 15 through cure timer contacts 14a and 15a, 15 to 12 through relay R1, 12 to 16 through switch SW8, 16 to 1 through relay MCR. Therefore, the doser solenoid DS causes dosing to start; and this will continue until the right press doser timer times out whereupon its contact 13c separates from 28c (deenergizing solenoid DS) and engages contact 20b whereupon coil TDc of relay TD is energized, thereby closing contacts 21a and 16c. The circuit of relay coil TDc is line 9, TDc, line 20, contacts 20b and 13c of right doser timer, 13 to 14 through relay R1, 14 to 15 through the cure timer, 15 to 12 through relay R1, 12 to 16 through switch SW8, 16 to 1 through relay MCR. When relay TD closes, the pill-maker clutch solenoid CS connected with line 9 is energized and it causes the pill-maker to operate. Cure timer reset coil rs is energized when relay TD closes and the cure timer is reset and its contact 15a separates from contact 14a. The energization of clutch solenoid CS causes the pill-maker clutch to engage for one revolution. Relay coil TDc is disconnected when the cure timer is reset because 15a separates from 14a; but relay TD, which is slow to open, keeps solenoid CS energized long enough to allow the pill-maker shaft 61 to turn the point 65 of disc 64 beyond the notch in lever 66. A pill is made during period C and the operator places it in the open lower mold of the right press. Pillmaker shaft 61 stops at the end of one revolution with cam 135 causing switch SW7 to shift from 16/17 to 16/18 and switch SW8 to shift from 16/12 to 16/11. When 16 went to 11, formerly energized relay R1 is deenergized and right mold solenoid MSR is deenergized and the right upper mold rises after the ram of the right lower mold underneath had descended and then the right table indexes.

When switch SW7 shifts from 16/17 to 16/18, relay L3 opens and relay L1 closes because its coil L1c is connected as follows: 3 to 9 through relay MCR, L1c, 18 to 16 through switch SW7, 16 to 1, through relay MCR. Relay L1 closes contacts 23b and 22b, 6L' and 7L', 19c and 14c, 18b and 15b. Because relay L1 closed 6L' and 7L', the left mold solenoid MCL remains energized through periods D, E, F. At the end of period F, relay L1 opens because switch SW7 shifts from 16/18 to 16/17 and the left mold solenoid MSL is deenergized, the left upper mold rises after the ram of the left lower mold underneath had descended, and the left table indexes. The cycle for the left press begins again when indexing of the left table is completed.

The cycle for the right press begins at period D. Relay L1 is closed during periods D, E and F. During the indexing of the right press, right table switch TSR connects lines R5 and R8. Coil R3c is energized through the following circuit: 3 to 9 through relay MCR, R3c, R5 to R8 through switch TSR, R8 to 10 through switch OSR, 10 to 4 through switch SW6, 4 to 1 through switch SW10, Fig. 56. Relay R3 closes and connects R3c with line 11. Then the circuit of coil R3c is: 3 to 9 through relay MCR, R3c, 11 to 16 through switch SW8, 16 to 1 through relay MCR. Relay R3 stays closed after switch TSR shifts from R8/R5 to R8/R7. Relay R3 connects 6R and 7R. Period D begins when the cure timer motor MC receives current through the following circuit; 1 to 16 through relay MCR, 16 to 18 through switch SW7, 18 to 15 through relay L1 (then closed), motor MC, 9 to 3 through relay MCR. The cure timer starts timing. The mold solenoid MSR which starts the right press is energized through the following circuit: 1 to 4 through switch SW10 (Fig. 56), 4 to 10 through switch SW6, 10 to R8 through switch OSR, R8 to R7 through right table switch TSR which connects with 7" at the end of indexing, R7 to R6 through relay R3, right mold solenoid MSR, 2 to 9 through switch SW12, 9 to 3 through relay MCR. The upper mold of the right press descends upon the right press lower mold under it and the ram of said lower mold ascends to cause the molding material in the injection cylinder to be forced into the mold cavities; and curing in the right press starts under heat and pressure.

The cure timer times out and causes its contact 15a to connect with 14a. Motor ML of the left press doser timer receives current through the following circuit: 3 to 9 through relay MCR, ML, 19 to 14 through relay L1 (then closed), 14 to 15 through the cure timer (then timed out), 15 to 18 through relay L1, 18 to 16 through switch SW7, 16 to 1 through relay MCR. The left press doser timer starts timing and period E begins. Doser solenoid DS receives current through the following circuit: 3 to 9 through relay MCR, solenoid DS, 25 to 24 through switch OSL, 24 to 23 through switch DSL, 23 to 22 through relay L1, 22 to 19 through left press doser timer contacts 22a and 19a, 19 to 14 through relay L1, 14 to 15 through cure timer contacts 14a and 15a, 15 to 18 through relay L1, 18 to 16 through switch SW7, 16 to 1 through relay MCR. Therefore, the doser solenoid DS causes dosing to start; and will continue until the left press doser timer times out, whereupon its contacts 19a separates from 22a (deenergizing solenoid DS) and engages contact 20b, whereupon coil TDc of relay TD is energized, thereby closing contacts 21a and 16c. The circuit of relay coil TDc is line 9, TDc, line 20, contacts 20a and 19a of left press doser timer, 19 to 14 through relay L1, 14 to 15 through the cure timer, 15 to 18 through relay L1, 18 to 16 through switch SW7, 16 to 1 through relay MCR. When relay TD closes, the pill-maker clutch solenoid CS connected with line 9 is energized and it causes the pill-maker to operate. Cure timer reset coil rs is energized when relay TD closes and the cure timer is reset, and its contact 15a separates from contact 14a. The energization of clutch solenoid CS causes the pill-maker clutch to engage for one revolution. Relay coil TDc is disconnected when the cure timer is reset because 15a separates from 14a; but relay TD which is slow to open, keeps solenoid CS energized long enough to allow the pill-maker shaft 61 to turn the point 65 of disc 64 beyond the notch in lever 66. A pill is made during period F and the operator places it in the open lower mold of the left press. Pill-maker shaft 61 stops at the end of one revolution with cam 135, causing switch SW7 to shift from 16/18 to 16/17 and switch SW8 to shift from 16/11 to 16/12. When switch SW7 connects 16 and 17, formerly energized relay L1 is deenergized and the left mold solenoid is deenergized and the left upper mold rises after the ram of the left lower mold underneath had descended, and the left table indexes. During indexing of the left table line L5 connected to coil L3c of relay is again energized and the cycle of the left press is repeated.

When switch SW8 shifted from 16/11 to 16/12 relay R3 opened and relay R1 closed because its coil R1c was energized through the following circuit: 3 to 9 through relay MCR, coil R1c, 12 to 16 through switch SW8, 16 to 1 through relay MCR. Relay R1c closes its contacts 27a and 28a, 6R' and 7R', 14b and 13b, 12c and 15c. Since 6R' engages 7R', right mold solenoid MSR remains energized although relay R3 opened; and solenoid MSR remains energized during periods A, B and C. At the end of period C, when SW8 switches from 16/12 to 16/11, relay R1 opens and the right mold solenoid MSR is deenergized. The right upper mold rises after the ram of the right lower mold underneath had descended, and the right table indexes. The cycle of the right press ends just as the right table begins indexing. During right table indexing when switch TSR connects R5 and R8, relay R3 is closed and stays closed after indexing and the cycle of the right press continues as before.

The left press doser timer is reset when its reset coil rsL is energized by closure of relay L3 and through the following circuit: 1, SW9, 4, SW6, 10, OSL, L8, TSL, L5, relay L3, 17, coil rsL, 9, MCR, 3. The right press doser timer is reset which its reset coil rsR is energized by closure of relay R3 and through the following circuit: 1, SW10, 4, SW6, 10, OSR, R8, TSR, R5, relay R3, 11, coil rsR, 9, MRC 3.

The cycle can be stopped at any time by pressing one of the switches SW1 or SW2 and can be started again where the cycle left off by pressing one of the switches SW3 or SW4. When setting up the press for a molding operation with new dies, the presses are cycled without operation of the doser and pill-maker. By manipulating the switches SW3 and SW1 the presses can be made to cycle in a jogging fashion. When the cycle is stopped it may be desirable to have one of the upper molds move up, for example, the upper mold of the left press. By moving switch SW11 from 9a to 3a, the safety solenoid SSL of the left press can be energized through the following circuit: lines 3 and L2 through switch SW11, L2 to L8 through safety solenoid SSL, L8 to 10 through OSL then closed, 10 to 4 through SW6 and 4 to 1 through SW9. Doser solenoid DS does not receive current because switch DSL is then open. Similarly, if it is desired to manipulate the right press, SW12 is moved to connect lines 3 and 9. The right press safety solenoid SSR receives current through the following circuit: 2 to R2 through switch SW12, R2 through SSR to R8, R8 to 10 through OSR then closed, 10 to 4 through SW6, 4 to 1 through SW10. As disclosed in the applications referred to, although the mold solenoid is deenergized, the energization of the safety solenoid will cause the upper mold of the press to rise if it is not already up.

The following is an example of the duration of the periods when the left and right presses require substantially equal doses. C and F 5 seconds each. If dosing times B and E are 12 seconds each and the total cure time is 64 seconds, the timing-out time of the cure timer is 15 seconds in each of periods A and D.

The following is an example of the duration of the periods when the presses require different doses. C and F, 5 seconds each; B, 15 seconds; E, 9 seconds. If the cure time required for the right press is 68 seconds, the timing-out time of the cure timer is 17 seconds in each of periods A and D. The cure time for the left press would be less than 68 seconds since it requires less material, but no harm results to the material because it remains in the mold longer than necessary for the cure. Obviously, the equipment shown in Figs. 54–57 can be used most efficiently when the dose requirements of the two presses are substantially equal. However, under certain circumstances, the operation of the equipment when the dose requirements are substantially different is preferable to provide for separate and independent operation of presses each having its own doser.

While the embodiment of the present invention as herein disclosed, constitutes a preferred form, it is to be understood that other forms might be adopted, all coming within the scope of the claims which follow.

What is claimed is as follows:

1. Molding equipment including two molding presses distinguished as left press and right press, each press comprising a conveyor having a plurality of molds each having a compression chamber for receiving molding material and a ram in the compression chamber and movable to locate one mold at a loading station and another at a work station, a mold at the work station adapted to engage with the mold located by the conveyor at the work station, a press controller having first and second positions, an hydraulic system under control by the controller and operable automatically, when the controller is in first position, to effect in sequence the closing of the molds, the movement of the ram to inject material in the compression chamber of a mold into the mold cavities, and operable automatically when the controller is in the second position to effect in sequence, retraction of the ram, separation of the molds and indexing of the conveyor, said equipment including also a doser having provisions for heating molding material and discharging it, a doser controller having a first position for causing the doser to operate and a second position for causing the doser to stop, a pill-maker which receives heated material from the doser and has means for forming the heated material into a briquet or pill to be placed by the operator in the compression chamber of a mold of a press then inactive, a pill-maker controller having a first position for nonoperation of the pill-maker and a second position for causing operation thereof, a cure timer, a left press dose timer for controlling the duration of operation of the doser for preparation of a charge for the left press, a right press dose timer for controlling the duration of operation of the doser for preparation of a charge for the right press, means rendered operative in response to indexing of the left press conveyor for causing the cure timer to operate and the left press control to move into first position, means responsive to timing out of the cure timer for causing the doser controller to move into first position and the right press dose timer to operate, means responsive to the timing out of the right press dose timer to cause the doser controller to move to second position and the pill-maker controller to move to second position to cause operation of the pill-maker for the benefit of the right press, means responsive to completion of the operation of the pill-maker for causing the right press controller to move into second position, means rendered operative in response to indexing of the right press conveyor for causing the cure timer to operate and the right press control to move into first position, means responsive to the timing out of the cure timer for causing the doser controller to move into first position and the left press dose timer to operate, means responsive to the timing out of the left press dose timer to cause the doser controller to move to second position and the pill-maker controller to move into second position to cause operation of the pill-maker for the benefit of the left press and means responsive to completion of the operation of the pill-maker for causing the left press controller to move into second position.

2. Molding equipment according to claim 1 having manually operable devices for preventing the operation of one or the other of the press controllers and preventing operation of the doser and pill-maker for benefit of the non-operating press.

3. Molding equipment including two molding presses, distinguished as left press and right press, each press comprising a conveyor having a plurality of molds each having a compression chamber for receiving molding material and a ram in the compression chamber and movable to locate one mold at a loading station and another mold at a work station, a mold at the work station adapted to engage with the mold located by the conveyor at the work station, a control solenoid, an hydraulic system under control of the solenoid and operable automatically, when the solenoid is energized, to effect in sequence the closing of the molds, the movement of a ram to inject material in the compression chamber of a mold into mold cavities, and operable automatically, when the solenoid is deenergized, to effect in sequence retraction of the ram, separation of the molds and indexing of the conveyor, said equipment including also a doser having provisions for heating molding material and discharging it, a doser control solenoid which causes the doser to operate so long as said solenoid is operated, a pill-maker which receives heated material discharged from the doser and has means for forming the heated material into a briquet or pill to be placed by an operator in the compression chamber of a mold of a press then inactive, a pill maker control solenoid energization of which causes operation of the pill maker, a cure timer, a left press dose timer for controlling the duration of operation of the doser for preparation of a charge for the left press, a right press dose timer for controlling the duration of operation of the doser for preparation of a charge for the right press, a circuit established in response to completion of operation of the pill maker to make a pill for the left press for causing operation of the cure timer, a circuit established in response to indexing of the left press conveyor and in response to completion of said operation of the pill maker for causing energization of the left press control solenoid, a circuit completed in response to timing-out of the cure timer for causing energization of the doser solenoid and operation of the right press dose timer and interrupted in response to timing-out of the right press dose timer, a circuit completed in response to timing out of the right press dose timer for causing energization of the pill-maker control solenoid to cause the pill-maker to make a pill for the right press, means stopping energization of the right press control solenoid in response to completion of operation of the last mentioned operation of the pill-maker, a circuit established in response to completion of the last mentioned operation of the pill maker for causing operation of the cure timer, a circuit established in response to indexing of the right press and completion of the last mentioned operation of the pill maker for causing energization of the right press control solenoid, a circuit completed in response to timing-out of the cure timer for causing energization of the doser solenoid and operation of the left press dose timer and interrupted in response to timing out of the left press dose timer, a circuit completed in response to timing out of the left press dose timer for causing energization of the pill maker control solenoid to cause the pill maker to make a pill for the left press and means stopping energization of the left press control solenoid in response to the last mentioned operation of the pill maker.

4. Molding equipment according to claim 3 having manually operated switches respectively for opening control circuits of the presses in order to select one or the other of the presses for operation with or without operation of the doser and pill maker for its benefit.

5. Molding equipment according to claim 3 having left and right press pumps to provide pressure fluid for operation of their respective hydraulic systems, electric motors respectively for driving the pumps, magnetic switches for connecting the motors with a current source, each switch having a magnet coil, a circuit for connecting the coil with a current source, start and stop switches for controlling said circuit, motor over-load switches in said circuit, and a contact provided by said magnetic switch for controlling the control circuits of the press whose motor is controlled by the magnetic switch, whereby the control circuits of a press are rendered inactive when the motor associated with the press is stopped.

6. Molding equipment including two molding presses, distinguished as left press and right press, each press comprising a conveyor having a plurality of molds each having a compression chamber for receiving molding material and a ram in the compression chamber and movable to locate one mold at a loading station and another mold at a work station, a mold at the work station adapted to engage with the mold located by the conveyor at the work station, a control solenoid, an hydraulic system under control of the solenoid and operable automatically, when the solenoid is energized, to effect in sequence the closing of the molds, the movement of a ram to inject material in the compression chamber of a mold into mold cavities, and operable automatically, when the solenoid is deenergized, to effect in sequence retraction of the ram, separation of the molds and indexing of the conveyor, said equipment including also a doser having provisions for heating molding material and discharging it, a doser control solenoid which causes the doser to operate so long as said solenoid is operated, a pill-maker which receives heated material discharged from the doser and has means for forming the heated material into a briquet or pill to be placed by an operator in the compression chamber of a mold of a press then inactive, a pill maker control solenoid energization of which causes operation of the pill maker, a cure timer, a left press dose timer for controlling the duration of operation of the doser for preparation of a charge for the left press, a right press dose timer for controlling the duration of operation of the doser for preparation of a charge for the right press, first and second two way switches, first, second, third and fourth relays each having a magnet coil, a left conveyor operated switch, a right conveyor operated switch, a first relay closing circuit completed by the second two-way switch in first status at end of operating cycle of the pill-maker for benefit of the left press, a cure timer operating circuit completed by said two-way switch and the first relay, a second relay closing circuit completed by the first two-way switch in first status at the end of operating cycle of the pill-maker for benefit of the left press, a left-press control solenoid energizing circuit completed by the second relay and the left conveyor operated switch, a right press dose timer operating circuit completed by the cure timer, when timed out, the first relay switch and the second two-way switch in said status, a doser solenoid energizing circuit completed by the first relay switch and the second two-way switch in said status and also by contacts of the right press dose timer while timing, said doser solenoid being deenergized when said timer times-out, a time delay relay and a circuit causing its closure through contacts of the cure timer when timed out and through contacts of the right dose timer when timed out, a circuit for resetting the cure timer completed by closing of the time delay relay, a pill-maker control solenoid energizing circuit completed by the time relay, means operated by the pill-maker mechanism at the end of its cycle for benefit of the right press to change status of the two-way switches, namely to cause the first one to open the first and second relays, and the first two-way switch to be in a second status for energizing the third relay and the second two-way switch to be in a second status for energizing the fourth relay, the opening of the first relay causing deenergization of the right press control solenoid, a left press control solenoid energization maintaining circuit completed by closing of the third relay, a second cure timer operating circuit completed by the first two-way switch in second status and by the third relay switch, a right press control solenoid energizing circuit completed by the fourth relay, a left press dose timer operating circuit completed by the third relay, the cure timer when timed-out and the first two-way switch in second status, a second doser control solenoid energizing circuit controlled by the third relay, the cure timer when timed-out, the first two-way switch in second status and also by contacts of the left dose timer while timing said doser control solenoid being deenergized when the left dose timer times-out, a circuit causing closure of the time delay relay through contacts of the cure timer when timed out and through contacts of the left dose timer when timed out, a second circuit for resetting the cure timer completed by closing of the time delay relay, the pill maker control solenoid being energized as before stated by closure of the time delay relay, and the connections of the two-way switches being changed from second to first status by operation of the pill-maker mechanism at the end of its cycle for benefit of the left press, whereby the third and fourth relays are deenergized and open and second relay closes and the first relay closes, a right press control solenoid energization-maintaining circuit completed by closure of the first relay, and circuits for effecting resetting of the right and left press dose timers by closure of the fourth and second relays respectively.

EUGENE C. QUEAR.
WILLARD C. SHAW.
JAMES R. EDWARDS.

(References on following page)

REFERENCES CITED

The following references are of record in the file of this patent:

UNITED STATES PATENTS

| Number | Name | Date |
|---|---|---|
| 2,218,456 | Soubier et al. | Oct. 15, 1940 |
| 2,228,614 | Soubier et al. | Jan. 14, 1941 |
| 2,287,277 | Ryder | June 23, 1942 |
| 2,304,141 | Bergmann | Dec. 8, 1942 |
| 2,321,252 | Sayre | June 8, 1943 |
| 2,375,252 | Sayre | May 8, 1945 |
| 2,386,891 | Gregory | Oct. 16, 1945 |
| 2,404,559 | Ashbough | July 23, 1946 |
| 2,439,966 | Dinzl | Apr. 28, 1948 |
| 2,442,368 | Maynard | June 1, 1948 |